US010498574B2

(12) United States Patent
Seo et al.

(10) Patent No.: US 10,498,574 B2
(45) Date of Patent: Dec. 3, 2019

(54) METHOD FOR TRANSMITTING AND RECEIVING SIGNAL IN WIRELESS COMMUNICATION SYSTEM AND APPARATUS FOR PERFORMING SAME

(71) Applicant: LG ELECTRONICS INC., Seoul (KR)

(72) Inventors: Inkwon Seo, Seoul (KR); Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/554,141

(22) PCT Filed: Mar. 9, 2016

(86) PCT No.: PCT/KR2016/002360
§ 371 (c)(1),
(2) Date: Aug. 28, 2017

(87) PCT Pub. No.: WO2016/144100
PCT Pub. Date: Sep. 15, 2016

(65) Prior Publication Data
US 2018/0076993 A1 Mar. 15, 2018

Related U.S. Application Data

(60) Provisional application No. 62/130,573, filed on Mar. 9, 2015, provisional application No. 62/204,423, filed
(Continued)

(51) Int. Cl.
*H04L 27/26* (2006.01)
*H04L 27/34* (2006.01)
(Continued)

(52) U.S. Cl.
CPC .............. *H04L 27/26* (2013.01); *H04J 15/00* (2013.01); *H04L 27/2655* (2013.01);
(Continued)

(58) Field of Classification Search
USPC .......................................... 375/259; 370/312
See application file for complete search history.

(56) References Cited

U.S. PATENT DOCUMENTS 7,269,223 B2 9/2007 Learned et al.
2015/0171947 A1* 6/2015 Sun ........................ H04W 4/08 370/329

(Continued)

FOREIGN PATENT DOCUMENTS

EP 3 214 783 A1 9/2017
KR 10-2009-0015299 A 2/2009

(Continued)

OTHER PUBLICATIONS

Al-Imari et al., "Uplink Non-Orthogonal Multiple Access for 5G Wireless Networks", In: 2014 11th International Symposium on Wireless Communications Systems (ISWCS), Aug. 26-29, 2014, 5 pages.

*Primary Examiner* — David C Payne
*Assistant Examiner* — Sarah Hassan
(74) *Attorney, Agent, or Firm* — Birch, Stewart, Kolasch & Birch, LLP

(57) ABSTRACT

A method for receiving a signal by a first terminal in a wireless communication system supporting non-orthogonal multiple access (NOMA) according to an embodiment of the present invention comprises the steps of: receiving a NOMA signal in which signals for each of the first terminal and a second terminal belonging to the same NOMA pair are superposed; and demodulating the signal for the first terminal from the NOMA signal, using at least a part of a NOMA
(Continued)

Radio frame
Slot
0 #1 #2 ··· #18 #19
Subframe (a)

One radio frame, $T_s$=307200T = 10ms
One half-frame, $T_s$=153600T = 5ms
One slot $T_{slot}$=15360$T_s$
30720$T_s$
Subframe#0 Subframe#2 Subframe#3 Subframe#4 Subframe#5 Subframe#7 Subframe#8 Subframe#9
One subframe, 30720$T_s$
DwPTS GP UpPTS DwPTS GP UpPTS (b)

constellation which is configured by considering downlink transmission power and a modulation order for the second terminal, wherein only a bit corresponding to one digit is differently configured between the bit sequences of NOMA constellation points adjacent to each other in the NOMA constellation, and the complex coordinates (I, Q) of the NOMA constellation points are determined on the basis of a combination of downlink transmission power for the first terminal and the downlink transmission power for the second terminal.

13 Claims, 20 Drawing Sheets

Related U.S. Application Data on Aug. 12, 2015, provisional application No. 62/213,599, filed on Sep. 2, 2015.

(51) Int. Cl.
*H04J 99/00* (2009.01)
*H04L 27/36* (2006.01)
*H04W 52/18* (2009.01)
*H04L 27/38* (2006.01)

(52) U.S. Cl.
CPC .............. *H04L 27/34* (2013.01); *H04L 27/36* (2013.01); *H04L 27/38* (2013.01); *H04W 52/18* (2013.01)

(56) References Cited

U.S. PATENT DOCUMENTS

2015/0312074 A1* 10/2015 Zhu ..................... H04L 27/2627 370/329
2016/0112995 A1* 4/2016 Chen .................. H04L 27/3461 370/329

FOREIGN PATENT DOCUMENTS

KR 10-2013-0014502 A 2/2013
KR 10-1443600 B1 9/2014

* cited by examiner (a)

(b)

METHOD FOR TRANSMITTING AND RECEIVING SIGNAL IN WIRELESS COMMUNICATION SYSTEM AND APPARATUS FOR PERFORMING SAME

CROSS REFERENCE TO RELATED APPLICATIONS

This application is the National Phase of PCT International Application No. PCT/KR2016/002360, filed on Mar. 9, 2016, which claims priority under 35 U.S.C. 119(e) to U.S. Provisional Application No. 62/130,573, filed on Mar. 9, 2015, No. 62/204,423, filed on Aug. 12, 2015 and No. 62/213,599, filed on Sep. 2, 2015, all of which are hereby expressly incorporated by reference into the present application.

TECHNICAL FIELD

The present invention relates to a wireless communication system, and more particularly, to a method for modulating or demodulating a signal in a wireless communication system supporting non-orthogonal multiple access (NOMA) and apparatus for performing the same.

BACKGROUND ART

Wireless communication systems have been widely deployed to provide various types of communication services such as voice or data. In general, a wireless communication system is a multiple access system that supports communication with multiple users by sharing available system resources (e.g., bandwidth, transmit power, etc.). The multiple access system can be categorized into orthogonal multiple access (OMA) and non-orthogonal multiple access (NOMA) depending on whether orthogonality is guaranteed.

As examples of the OMA, frequency division multiple access (FDMA), time division multiple access (TDMA), code division multiple access (CDMA), spatial domain multiple access (SDMA) are included. For each of them, the multiple access is performed in a frequency domain, time domain, code domain, and spatial domain.

Meanwhile, as a multiple access scheme in a power domain, the NOMA can be interconnected with the OMA, whereby it is possible to improve spectral efficiency.

DISCLOSURE OF THE INVENTION

Technical Task

The technical task of the present invention is to provide a method for efficiently performing modulation or demodulation at a transmitter and receiver using a non-orthogonal multiple access (NOMA) constellation in a wireless communication system supporting NOMA.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for receiving a signal by a first user equipment (UE) in a wireless communication system supporting non-orthogonal multiple access (NOMA), including: receiving a NOMA signal in which a signal for the first UE and a signal for a second UE are superposed, the first UE and the second UE belonging to the same NOMA pair; and demodulating the signal for the first UE from the NOMA signal using at least part of a NOMA constellation configured in consideration of downlink transmit power and modulation order for the second UE. In this case, only a bit corresponding to one digit may be differently configured between the bit sequences of NOMA constellation points adjacent to each other in the NOMA constellation, and complex coordinates (I, Q) of NOMA constellation points may be determined based on a combination of downlink transmit power for the first UE and the downlink transmit power for the second UE.

In another aspect of the present invention, provided herein is a first user equipment (UE) for receiving a signal in a wireless communication system supporting non-orthogonal multiple access (NOMA), including: a receiver configured to receive a NOMA signal in which a signal for the first UE and a signal a second UE are superposed, the first UE and the second UE belonging to the same NOMA pair; and a processor configured to demodulate the signal for the first UE from the NOMA signal using at least part of a NOMA constellation configured in consideration of downlink transmit power and modulation order for the second UE. In this case, only a bit corresponding to one digit may be differently configured between the bit sequences of NOMA constellation points adjacent to each other in the NOMA constellation, and complex coordinates (I, Q) of NOMA constellation points may be determined based on a combination of downlink transmit power for the first UE and the downlink transmit power for the second UE.

In a further aspect of the present invention, provided herein is a method for transmitting a signal by a base station (BS) in a wireless communication system supporting non-orthogonal multiple access (NOMA), including: determining a NOMA constellation by considering downlink transmit power and modulation order for each of a first user equipment (UE) and a second UE which belong to the same NOMA pair; modulating a NOMA signal in which a signal for the first UE and a signal for second UE are superposed using the NOMA constellation; and transmitting the NOMA signal. In this case, only a bit corresponding to one digit is differently configured between the bit sequences of NOMA constellation points adjacent to each other in the NOMA constellation, and complex coordinates (I, Q) of NOMA constellation points may be determined based on a combination of downlink transmit power for the first UE and the downlink transmit power for the second UE.

Preferably, the first UE may either demodulate the signal for the first UE in a maximum likelihood (ML) manner by constructing an entirety of the NOMA constellation or demodulate the signal for the first UE in a successive interference cancellation (SIC) scheme by reconstructing constellation points corresponding to a part of the NOMA constellation.

Preferably, upper or lower N bits ($c_1c_2 \ldots c_N$) in a bit sequence with a length of (M+N), which is mapped to each of the NOMA constellation points, may be defined according to the following equation: $c_1=(((a_1 \otimes a_3) \otimes a_5) \ldots \otimes a_5) \textcircled{z} b_1$; $c_2=(((a_2 \otimes a_4) \otimes a_6) \ldots \otimes a_M) \textcircled{z} b_2$; and $c_i=b_i$ ($3 \le i \le N$), where '$\otimes$' and '$\textcircled{z}$' are identical or different predetermined bit-wise operations, '$b_1b_2 \ldots b_N$' is a bit sequence for the first UE, '$a_1a_2 \ldots a_M$' is a bit sequence for the second UE, 'M' is the modulation order of the second UE, and 'N' is modulation order of the first UE. More preferably, remaining M bits in the (M+N)-length bit sequence may be configured to be identical to the bit sequence of the second UE, '$a_1 a_2 \ldots a_M$' and the predetermined bit-wise operations may include at least one of an exclusive OR (XOR) operation and a not exclusive OR (XNOR) operation.

Preferably, the first UE may demodulate the signal for the second UE using a first constellation corresponding to the modulation order for the second UE, cancel the signal for the second UE from the NOMA signal using a result obtained by demodulating the signal for the second UE, and demodulate and decoding the signal for the first UE using a residual signal after cancelling and a second constellation corresponding to modulation order for the first UE.

More preferably, the first UE may perform a not exclusive OR (XNOR) operation between results of the XNOR operation of odd-indexed bits of a bit sequence of the second UE and respective first bits of bit sequences of a reference constellation corresponding to the modulation order of the first UE, perform the XNOR operation between results of the XNOR operation of even-indexed bits of the bit sequence of the second UE and respective second bits of the bit sequences of the reference constellation, and generate a second constellation by inserting results of the XNOR operation for the respective first bits and results of the XNOR operation for the respective second bits into the reference constellation.

Preferably, the NOMA constellation may include $M^2$ constellation point groups, each having $N^2$ constellation points, where 'N' is modulation order of the first UE and 'M' is the modulation order of the second UE, and spacing between $N^2$ constellation points belonging to the same constellation point group may be determined based on the downlink transmit power for the first UE and spacing between centers of the $M^2$ constellation point groups is determined based on the downlink transmit power of the second UE.

Preferably, the same beam pattern may be applied to the first and second UEs belonging to the same NOMA pair and a difference between the downlink transmit power of the first and second UEs may be equal to or greater than a predetermined threshold.

Preferably, the BS may signal, to a UE with lower downlink transmit power among the first and second UEs, information on modulation order and downlink transmit power of the other UE with higher downlink transmit power.

Preferably, the first UE may transmit information on a receiver type of the first UE to the BS. In this case, the receiver type may include at least one of a maximum likelihood (ML) type and a successive interference cancellation (SIC) type.

Advantageous Effects

According to embodiments of the present invention, it is possible to not only reduce a bit error rate by maintaining a bit difference between adjacent NOMA constellation points as a single digit but also to minimize processing overhead of a transmitter or receiver for configuring a NOMA constellation.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Figure 1:
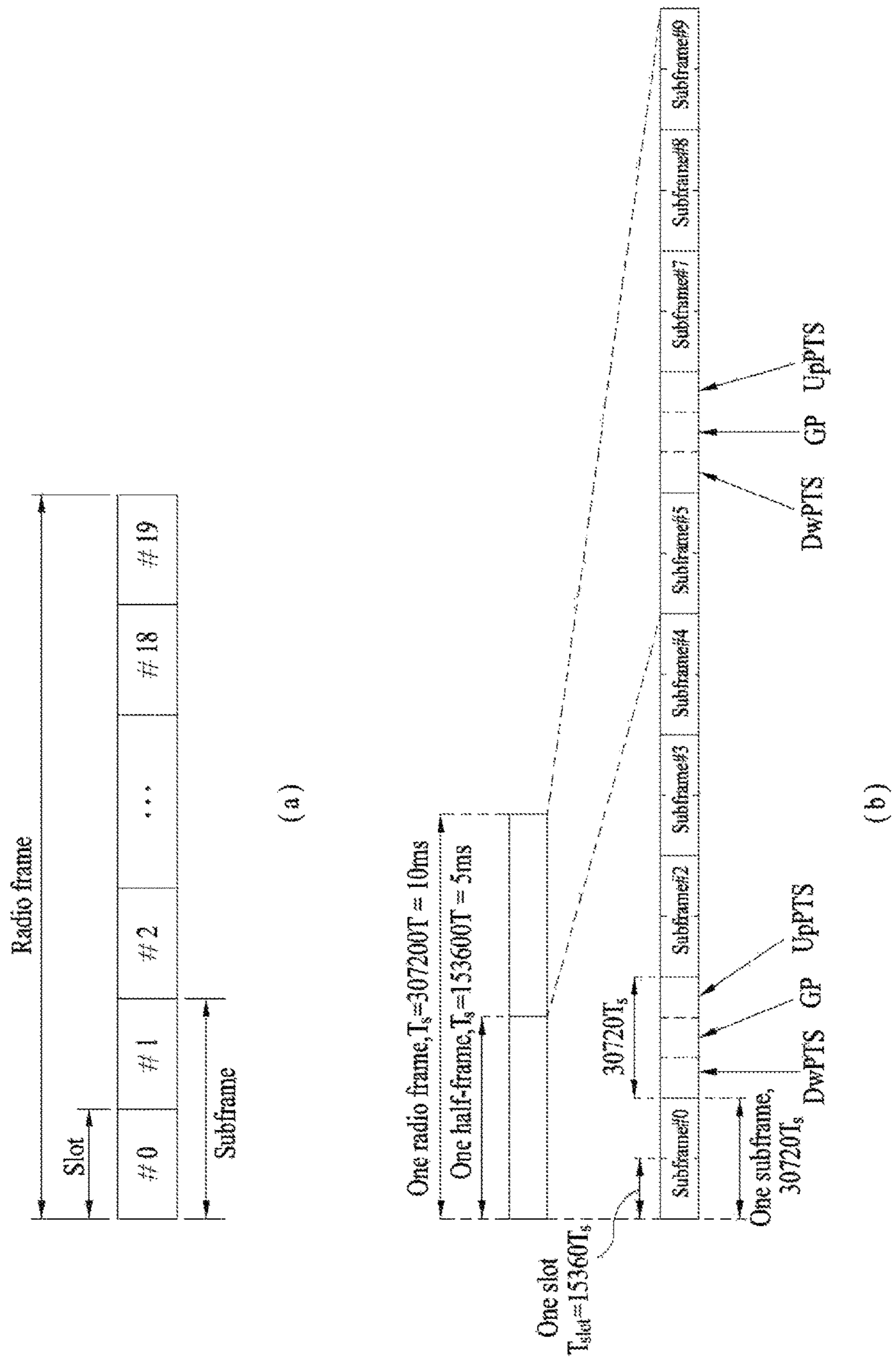
FIG. 1 is a diagram illustrating a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

NOMA Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(*b*) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
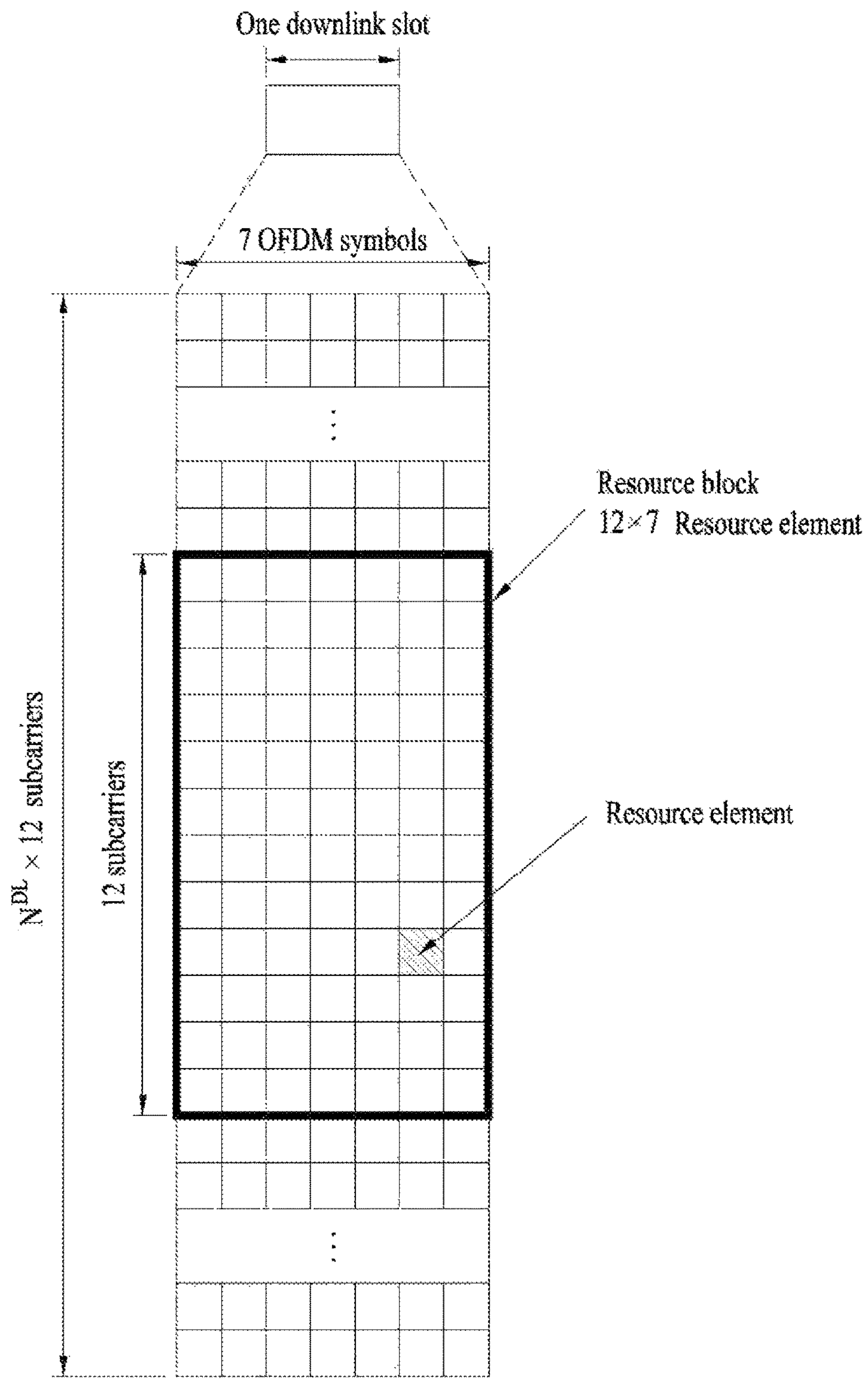
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
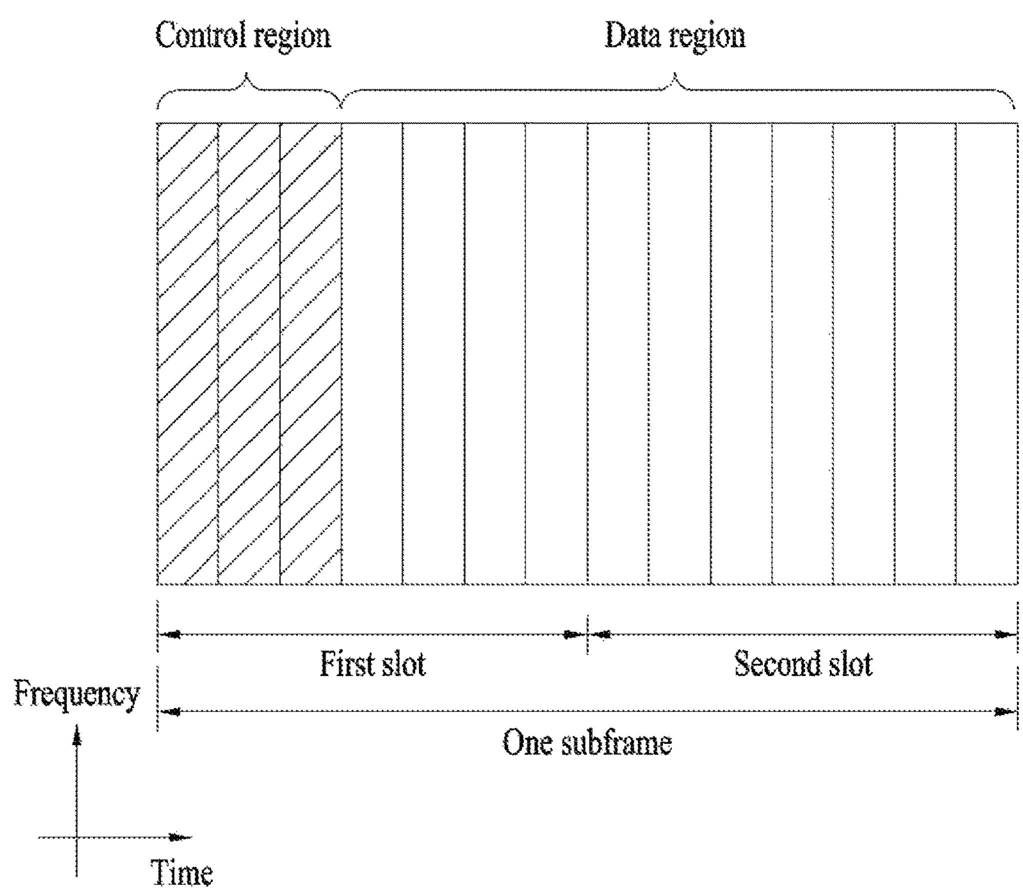
FIG. 3 is a diagram illustrating a downlink subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
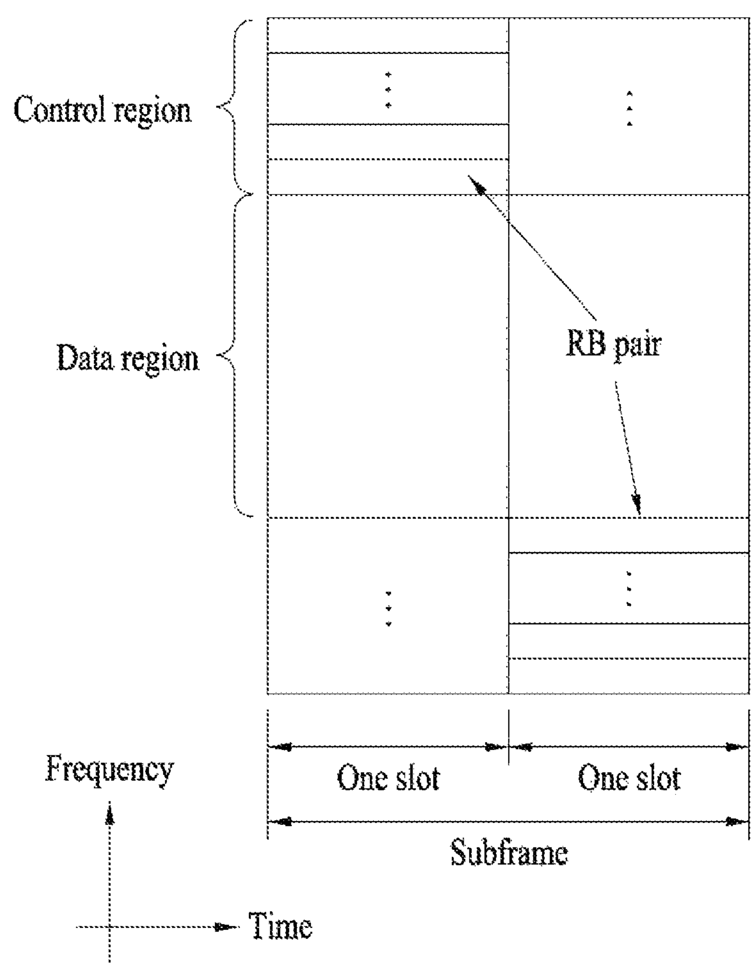
FIG. 4 is a diagram illustrating an uplink subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
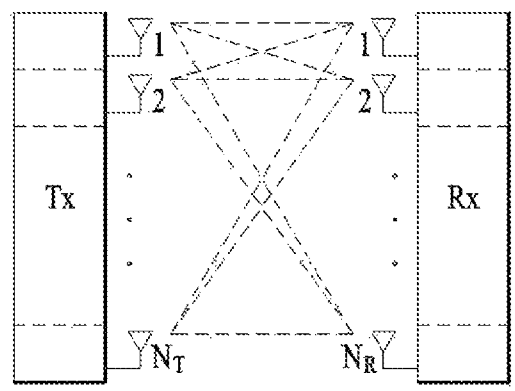
FIG. 5 is a schematic diagram illustrating a wireless communication system having multiple antennas.
Figure 5:
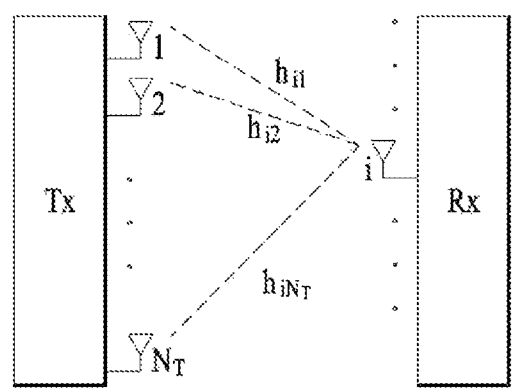

FIG. 5 is a diagram illustrating a configuration of a wireless communication system having multiple antennas.

As shown in FIG. 5(*a*), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i=\min(N_T,N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S=\lfloor s_1,s_2, \ldots ,s_{N_T}\rfloor^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2 \ldots P_{N_T}$, respectively, the transmission information with adjusted transmit powers can be represented as Equation 3.

$$\hat{s}=[\hat{s}_1,\hat{s}_2, \ldots \hat{s}_{N_T}]^T=[P_1s_1,P_2s_2, \ldots ,P_{N_T}s_{N_T}]T \quad \text{[Equation 3]}$$

In addition, can $\hat{s}$ be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y=[y_1,y_2, \ldots ,y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(*b*) is a diagram illustrating channels from the NT transmit antennas to the receive antenna i. The channels may be combined and expressed in the form of a vector and a matrix. In FIG. 5(*b*), the channels from the NT transmit antennas to the receive antenna i can be expressed as follows.

$$h_i^T=[h_{i1},h_{i2}, \ldots ,h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n=[n_1,n_2, \ldots n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\mathrm{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

Initial Access Procedure

Figure 6:
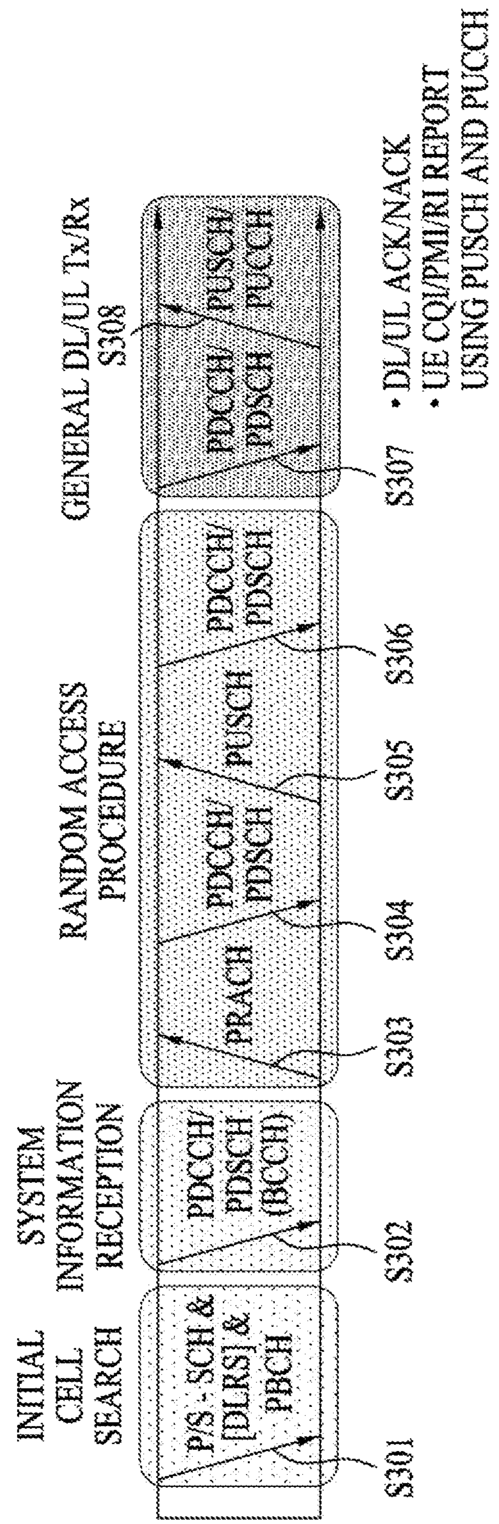
FIG. 6 is a diagram for explaining a signal transmission and reception method using an initial access procedure and physical channels used in the 3GPP system.

FIG. 6 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3 GPP LTE system, the UE may transmit the above-mentioned control informations such as CQI, PMI, RI and the like via PUSCH and/or PUCCH.

NOMA (Non-Orthogonal Multiple Access)

Among the following terms, the term "NOMA constellation" can be referred to as a combined constellation, superposed constellation, or composite constellation. In addition, a constellation can be represented in the form of a constellation map or a table where an IQ value and bit sequence are mapped (e.g., a modulation mapping table). Moreover, a constellation point can be referred to as a modulation symbol, complex symbol, or IQ value (i.e., I+jQ).

Figure 7:
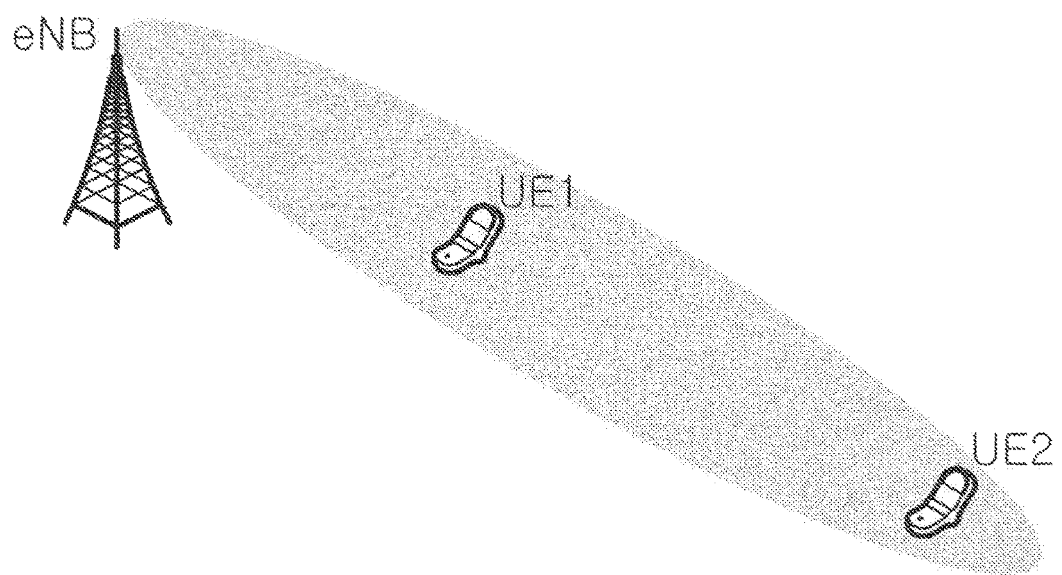
FIG. 7 illustrates an exemplary NOMA environment according to an embodiment of the present invention.

FIG. 7 illustrates an exemplary NOMA environment according to an embodiment of the present invention.

An eNB can configure UEs to which the same beam pattern is applied as a NOMA pair. Although it is assumed in FIG. 7 that UEs (UE1 and UE2) are configured as a single NOMA pair, this is for convenience of description and the invention can be applied when two or more UEs are configured as a single NOMA pair or NOMA group.

The eNB can configure the NOMA pair based on feedback information reported by each individual UE. For example, if the eNB determines that the same beam pattern (e.g., precoding matrix) is applied to the UE1 and UE2 based on a CSI report received from each of the UE1 and UE2, the eNB can configure the UE1 and UE2 as the NOMA pair and then perform data transmission.

Meanwhile, according to another embodiment of the present invention, random beamforming can be used and the NOMA pair can be configured based on the random beamforming. Further, the scope of the present invention can be extended to NOMA between UEs where different beam patterns are applied.

The eNB may configure different transmit (Tx) power for each UE and each UE may perform transmission by superposing modulation symbols. In FIG. 7, the UE1 is allocated relatively low Tx power is allocated and the UE2 is allocated relatively high Tx power.

Figure 8:
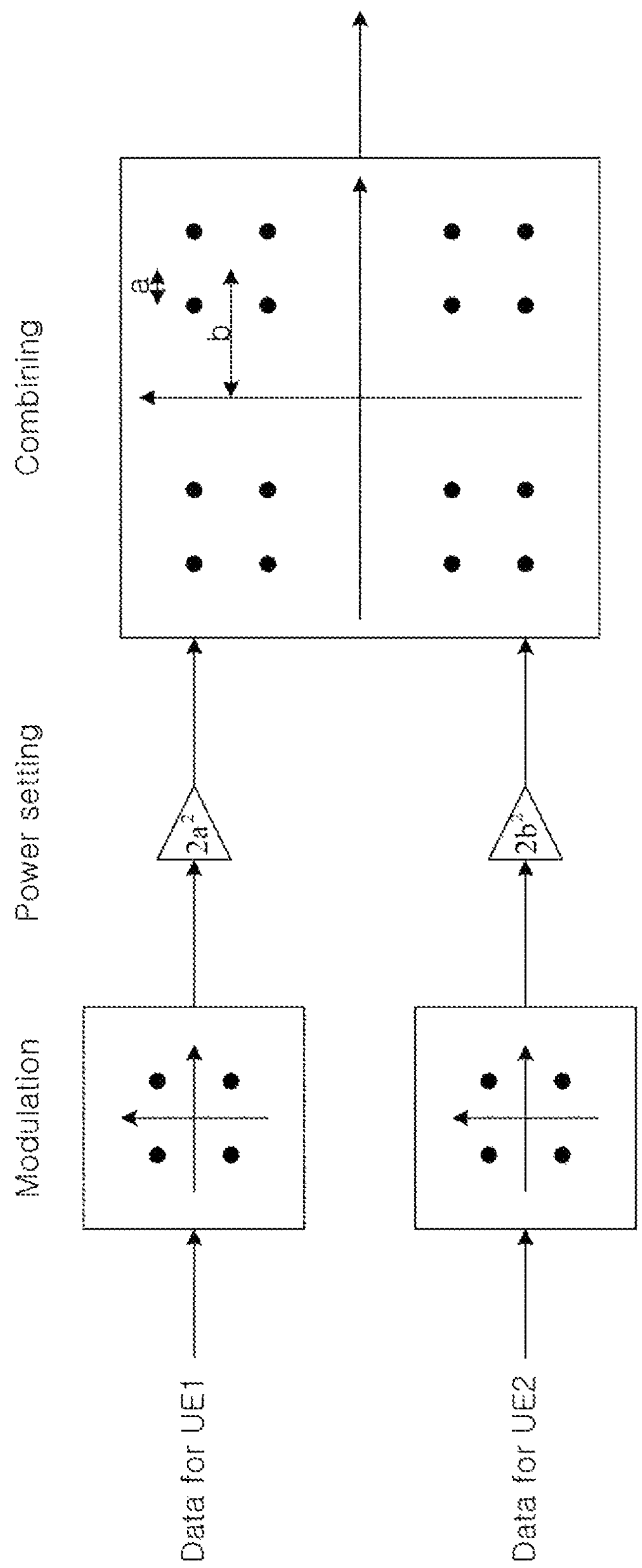
FIG. 8 illustrates an exemplary NOMA transmission operation.

FIG. 8 illustrates an exemplary NOMA transmission operation. In FIG. 8, it is assumed that a QPSK modulation scheme is applied to both UE1 and UE2.

Referring to FIG. 8, an eNB performs QPSK modulation on an information sequences for each of the UE1 and UE2. After configuring Tx power for each UE (b>a), the eNB performs transmission by superposing signals for both the UEs.

After receiving the signals generated as described with reference to FIG. 8, the UE2 may perform reception operation by considering a signal for the UE1 as a noise. That is, if a power difference between a signal for the UE 1 and a signal for the UE2 is significantly large, the signal for the UE1 may be considered as the noise. Thus, the UE2 can receive its signal as in the related art.

Alternatively, if the UE2 supports NOMA operation, the UE2 may use an interference mitigation scheme, i.e., the UE2 may cancel the signal for the UE1 using information received from the eNB.

Meanwhile, from the perspective of the UE1, the Tx power of the signal for the UE2 (UE2 signal) is relatively large. In this case, if the UE1 performs reception operation as in the related art, demodulation performance may be significantly degraded. Therefore, cancellation of the UE2 signal or a reception algorithm corresponding to the cancellation should be performed.

To cancel or erase the UE2 signal, the eNB may transmit information on the UE2 signal to the UE1. The information on the UE2 signal may include contents such as a receiver type of the UE1 (e.g., ML (maximum likelihood) receiver, SIC (successive interference cancellation) receiver, etc.) and a NOMA reception algorithm of the UE1. For example, the information on the UE2 signal transmitted to the UE1 may include UE ID, power (or power offset), modulation order, transport block size, the number of layers, RS, signal configuration including RS, PDSCH, etc., transmission mode, and the like. However, the present invention is not limited thereto.

For more accurate demodulation, information on the signal for the UE1 (UE1 signal) can be transmitted to the UE2. The contents included in the information to be transmitted to the UE 1 may be different from those included in the information to be transmitted to the UE2. For example, the information transmitted from the eNB can be determined in consideration of UE complexity, signaling overhead, etc.

The UE1 needs to perform demodulation by considering the UE2 signal, which has higher power while using the same resources (e.g., time, frequency, and space). To consider the signal for the UE2, the UE1 can use the following schemes.

1. Joint ML (Maximum Likelihood) Receiver

In the joint ML receiver, a combined constellation is obtained by superposing constellations of individual UEs, distances between individual points and received signals are calculated, and then a closest constellation point is estimated as a transmitted signal. The joint ML receiver can be implemented on a modulation symbol basis or a bit basis.

In the case of the ML receiver, it is important to configure a constellation such that there is only a one-bit difference between bit sequences of adjacent modulation symbols in order to minimize a bit-unit error (hereinafter referred to as a gray-labeled constellation).

In addition, since interference cancellation is not performed in the ML receiver, it has an advantage in that in the case of the NOMA operation, overhead of interference information signaled by the eNB is smaller than that of a successive interference cancellation (SIC) receiver.

2. SIC (Successive Interference Cancellation) Receiver

In the SIC receiver, an interference signal is generated based on particular information on interference, the interference signal is subtracted from a received signal, and then its own signal is demodulated.

The SIC receiver can be implemented as a symbol level, codeword level, etc.

In the symbol-level SIC, modulation symbols of the interference signal are eliminated by processing the interference signal only at the symbol level. Therefore, in the symbol-level SIC, the interference signal is not decoded but its own signal is decoded only.

In the codeword-level SIC, an information bit sequence (e.g., codeword) is obtained by performing not only demodulation but also decoding on the interference signal. Thereafter, the information bit sequence is encoded and modulated again (e.g., a codeword is encoded and modulated as in a transmitter). Further, a signal is generated by multiplying a modulation symbol generated based on the modulation result and an estimated channel component and then, the generated signal is eliminated from the received signal to obtain its own signal.

When the SIC receiver is used, reception operation is not performed after interference cancellation and thus, a combined constellation may not be used at the receiver. However, due to interference information that is transmitted from the eNB for more accurate interference cancellation, overhead may be increased compared to the joint ML receiver.

Additionally, in the NOMA operation, since two UEs belonging to the NOMA pair can perform channel estimation using the same RS, performance of the SIC receiver is determined according to a power difference between signals transmitted to the UEs. For example, if power allocated for the two UEs in the NOMA pair is similar to each other, channel estimation accuracy may be decreased and thus, the performance of the SIC receiver may be degraded compared to when the power difference is large.

Based on the above discussion, a description will be given of a receiving operating method and constellation configuration method for the NOMA operation.

Receiver Type Selection for NOMA

Since the SIC receiver performance may be determined by power offset between the UEs in the NOMA pair as described above, the receiver type (e.g., joint ML vs SIC) may be determined based on a difference between Tx power for the UEs in the NOMA pair. For example, in FIG. 7, if a difference between Tx power for the UE1 and UE2 is equal to or higher than a threshold of X dB (e.g., 3 dB), the UE1 may operate as the SIC receiver. On the other hand, if the difference is lower than the threshold of X dB, the UE1 may operate as the (joint) ML receiver. To determine the receiver type of the UE1, the eNB may signal, to the UE1, a power difference between signals for the UE1 and UE2, which are transmitted from the eNB.

The embodiment of the present invention is not limited to the power offset transmitted from the eNB is used by the receiver only. According to an embodiment of the present invention, to reduce signaling overhead of the transmitter (i.e., eNB), signaling contents may be changed according to the receiver type.

For example, the (codeword-level) SIC receiver should perform decoding, encoding, and CRC checking with respect to an interference signal, most DCI on the interference signal needs to be transmitted. Thus, signaling overhead may be significantly increased or complexity of the receiver may be increased to overhear the DCI on the interference signal. On the other hand, the ML receiver does not need to perform decoding and CRC checking with respect to an interference signal, simple information such as power offset, modulation order, and the like may be signaled.

In other words, considering that a receiver type is changed according to power offset of the NOMA pair and overhead of information transmitted from the eNB is changed according to the receiver type, it is possible to improve performance of a receiver and reduce signaling overhead.

NOMA Constellation

If the NOMA operation is performed such that a constellation defined in the current 3GPP standard is used and power allocated for individual UEs is simply combined, bit sequences of adjacent modulation symbols may have two different digits.

Figure 9:
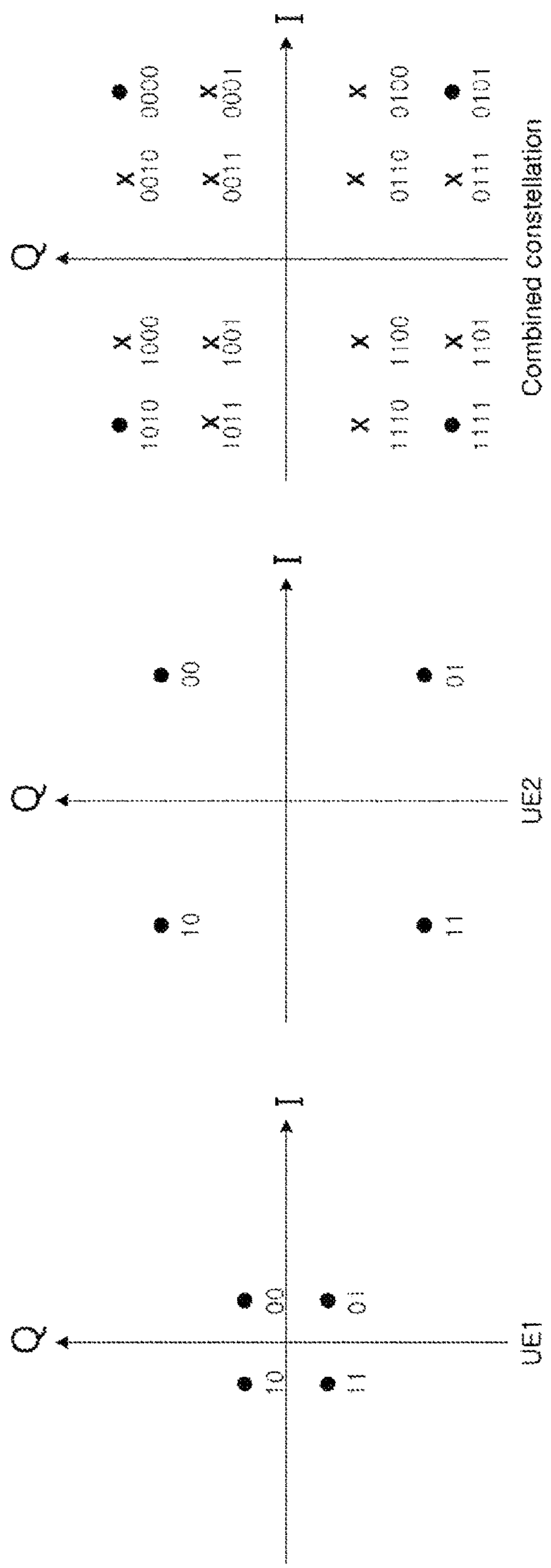
FIG. 9 illustrates positions of final modulation symbols and a bit sequence mapped to each of the symbols on a simply combined constellation.

FIG. 9 illustrates positions of final modulation symbols and a bit sequence mapped to each of the symbols on a simply combined constellation when it is assumed that the UE1 and UE2 in FIG. 8 use the QPSK defined in the 3GPP standard.

In the combined constellation of FIG. 9, adjacent constellation points denoted by "X" may have two different digits (bits). Here, the adjacent constellation points mean points with the same value of I or Q, that is, points with different value of both I and Q (i.e., (I, Q)) are excluded. Alternatively, the adjacent constellation points may mean a constellation point(s) having a short straight distance from a corresponding constellation point on the constellation. For example, X(1000) and X(0010) have different first and third bits from the most significant bit, X(1001) and X(0011) have different first and third bits from the most significant bit, and X(1001) and X(1100) have different second and fourth bits from the most significant bit.

If the number of different bits is 2 and an adjacent modulation symbol is recognized as a received signal, an error may occur at 50 percent in a bit level (in the case of the QPSK).

To solve this problem, it is possible to consider correlation between (standard) constellations of two UEs belonging to a NOMA pair in determining a bit sequence to be mapped to each constellation point on a combined constellation according to an embodiment of the present invention.

Embodiment 1

It could be interpreted as that the present embodiment is applied only when modulation order of high power signal is 2 (i.e., QPSK). For example, it is assumed that two UEs belonging to a NOMA pair use the QPSK. In addition, a bit sequence constituting each constellation point on a combined constellation is represented as $x_1$ $x_2$ $x_3$ $x_4$ (where $x_1$ is the most significant bit (MSB)). Moreover, a bit sequence of a QPSK constellation point of a high-power UE (e.g., UE2 in FIG. 7) having relatively high DL Tx power is represented as $m_1$ $m_2$, and a bit sequence of a QPSK constellation point of a low-power UE (e.g., UE1 in FIG. 7) having relatively low DL Tx power is represented as $n_i$ $n_2$.

In this case, according to an embodiment of the present invention, the bit sequence of each constellation point on the combined constellation can be expressed as shown in Equation 12.

$$x1=m1$$

$$x2=m2$$

$$x3=XNOR(m1,n1)$$

$$x4=XNOR(m1,n1) \quad \text{[Equation 12]}$$

In Equation 12, XNOR (i,j) means 'not' exclusive OR operation (the logical compliment of the exclusive OR (XOR)) and according to the XNOR operation, when two bits to be compared are the same, the operation result becomes 1. On the contrary, when the two bits are different, the operation result becomes 0. However, the above-described XNOR operation is merely exemplary, it can be replaced with other operations (e.g., XOR).

When the combined constellation is configured according to Equation 12, the most significant two bits of the bit sequence of each constellation point are determined by the bit sequence of the high-power UE constellation. A quadrant of the combined constellation is determined by the most significant two bits.

The least significant two bits may be determined by a bit-wise logical operation between bits of the high-power UE and bits of the low-power UE. For example, the bit-wise logical operation may be the XNOR operation.

Figure 10:
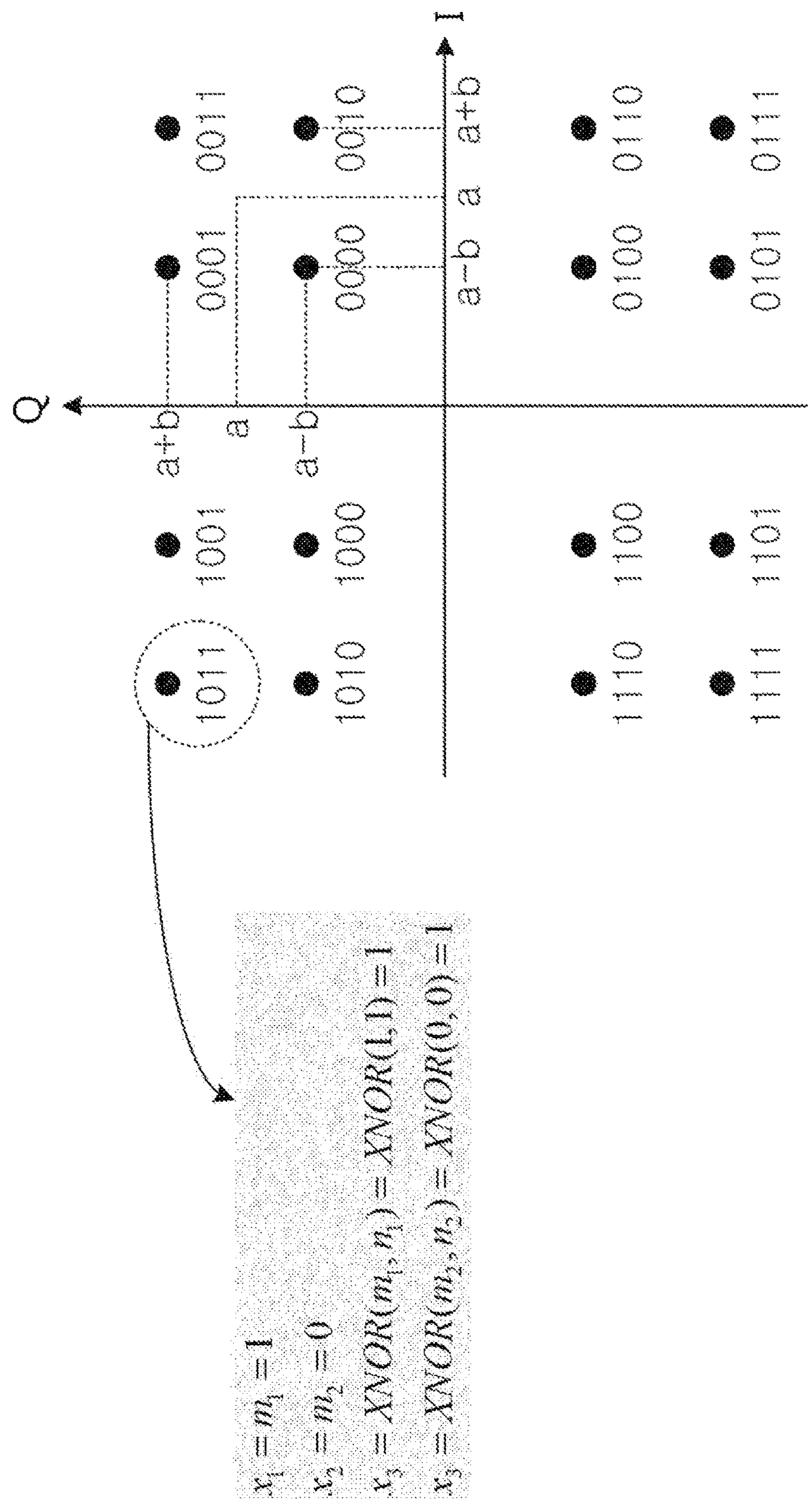
FIG. 10 illustrates a NOMA constellation according to an embodiment of the present invention.

FIG. 10 illustrates a NOMA constellation according to Equation 12. In FIG. 10, it is assumed that average power of a high-power UE is $2a^2$ and average power of a low-power UE is $2b^2$ where a>b (opposite to FIG. 8).

For example, constellation point 1011 in FIG. 10 is obtained by combining constellation point 10 of the second quadrant of the QPSK constellation of the high-power UE and constellation point 10 of the second quadrant of the QPSK constellation of the low-power UE.

As shown in FIG. 10, a difference between bit sequences of adjacent modulation symbols on the NOMA constellation configured according to the embodiment of the present invention is maintained as 1 bit.

In addition, although the XNOR operation is used in the present embodiment, an exclusive OR (XOR) operation can be used. Both the XNOR and XOR operations can be used to maintain a difference between bit sequences of adjacent modulation symbols as 1 bit. However, a bit sequence mapped to the same constellation point is different in both the XNOR and XOR operations.

Moreover, in the present embodiment, although it is assumed that the same modulation QPSK scheme is applied to the both UE1 and UE2, this is only for convenience of description and the invention is not limited thereto. For example, the NOMA constellation may be implemented using an arbitrary combination of various modulation schemes such as QPSK, 16QAM, 64QAM, etc. That is, the NOMA constellation may be configured to have a total of 64 constellation points through the combination of (QPSK, 16QAM) or have a total of 256 constellation points through the combination of (QPSK, 64QAM).

Figure 11:
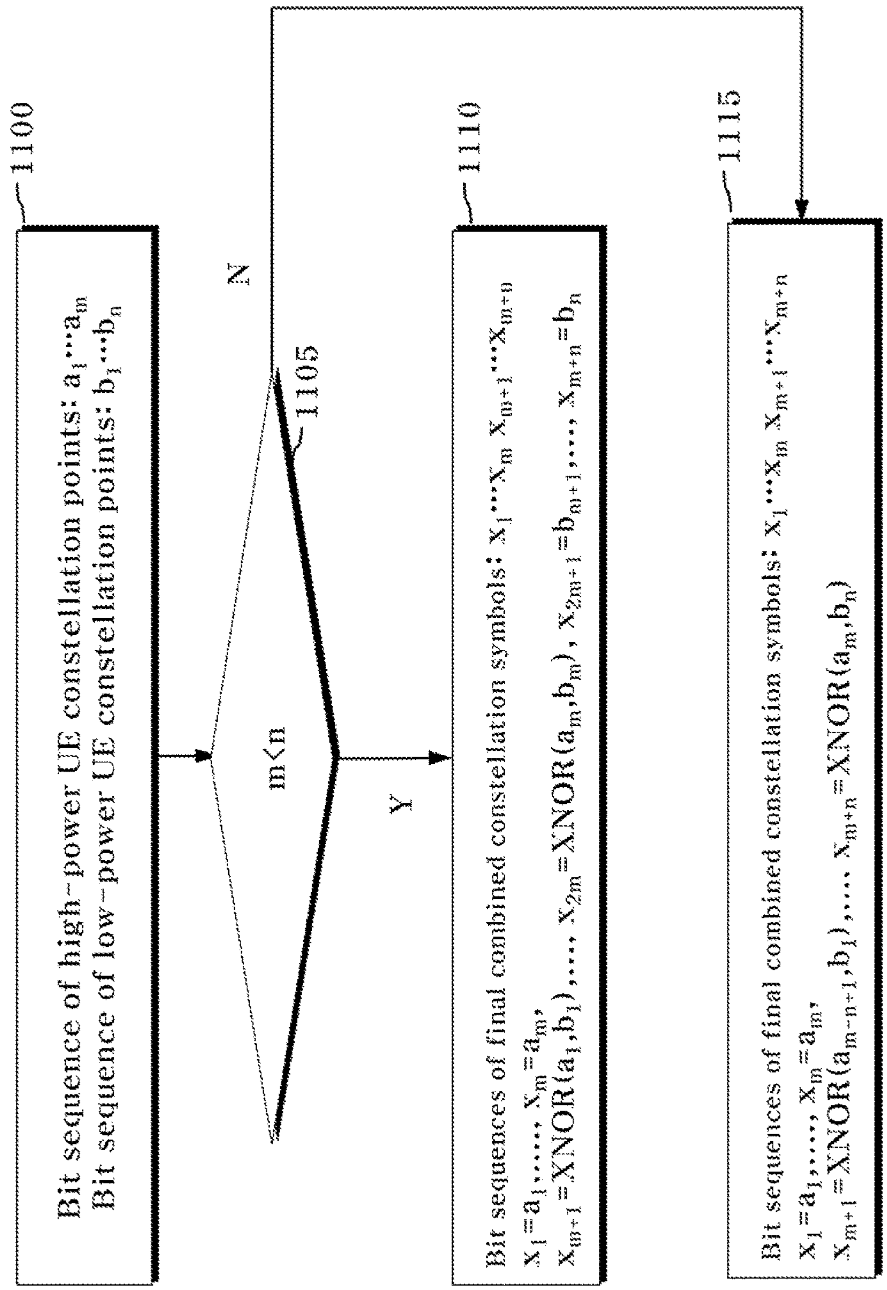
FIG. 11 is a flowchart for explaining a method of generating a bit sequence of NOMA constellation symbols according to an embodiment of the present invention.

FIG. 11 is a flowchart for explaining a method of generating a bit sequence of NOMA constellation symbols according to an embodiment of the present invention.

The embodiment of FIG. 11 corresponds to generalization of the aforementioned examples. In FIG. 11, a bit sequence of constellation points of each UE is not a bit sequence that is actually transmitted from each UE but a bit sequence of constellation points defined per modulation order in the current standard. For convenience of description, it is assumed that bit sequences of the NOMA constellation are arranged in the following order: high-power UE→low-power UE, but the invention is not limited thereto.

In FIG. 11, assume that modulation order of the high-power UE is m and modulation order of the low-power UE is n. In general, modulation order has values of 2, 4, and 6 in the QPSK, 16QAM, and 64 QAM, respectively.

First, a bit sequence ($a_1 \ldots a_m$) of the high-power UE constellation points and a bit sequence ($b_1 \ldots b_n$) of the low-power UE constellation points are inputted [1100].

When the high-power UE's modulation order m is lower than the low-power UE's modulation order n, a bit sequence of final combined constellation symbols ($x_1 \ldots x_m$ $x_{m+1} \ldots x_{m+n}$) has a value of [$x_1=a_1, \ldots, x_m=a_m$, $x_{m+1}=XNOR(a_1,b_1), \ldots, x_{2m}=XNOR(a_m,b_m)$, $x_{2m+1}=b_{m+1}, \ldots, x_{m+n}b_n$][1110].

On the contrary, when the high-power UE's modulation order m is higher than the low-power UE's modulation order n, the bit sequence of final combined constellation symbols ($x_1 \ldots x_m$ $x_{m+1} \ldots x_{m+n}$) has a value of [$x_1=a_1, \ldots, x_m=a_m$, $x_{m+1}=XNOR(a_{m-n+1},b_1), \ldots, x_{m+n}=XNOR(a_m,b_n)$] [1115].

Meanwhile, in case of m=n, the results of the steps 1110 and 1115 are the same.

Figure 12:
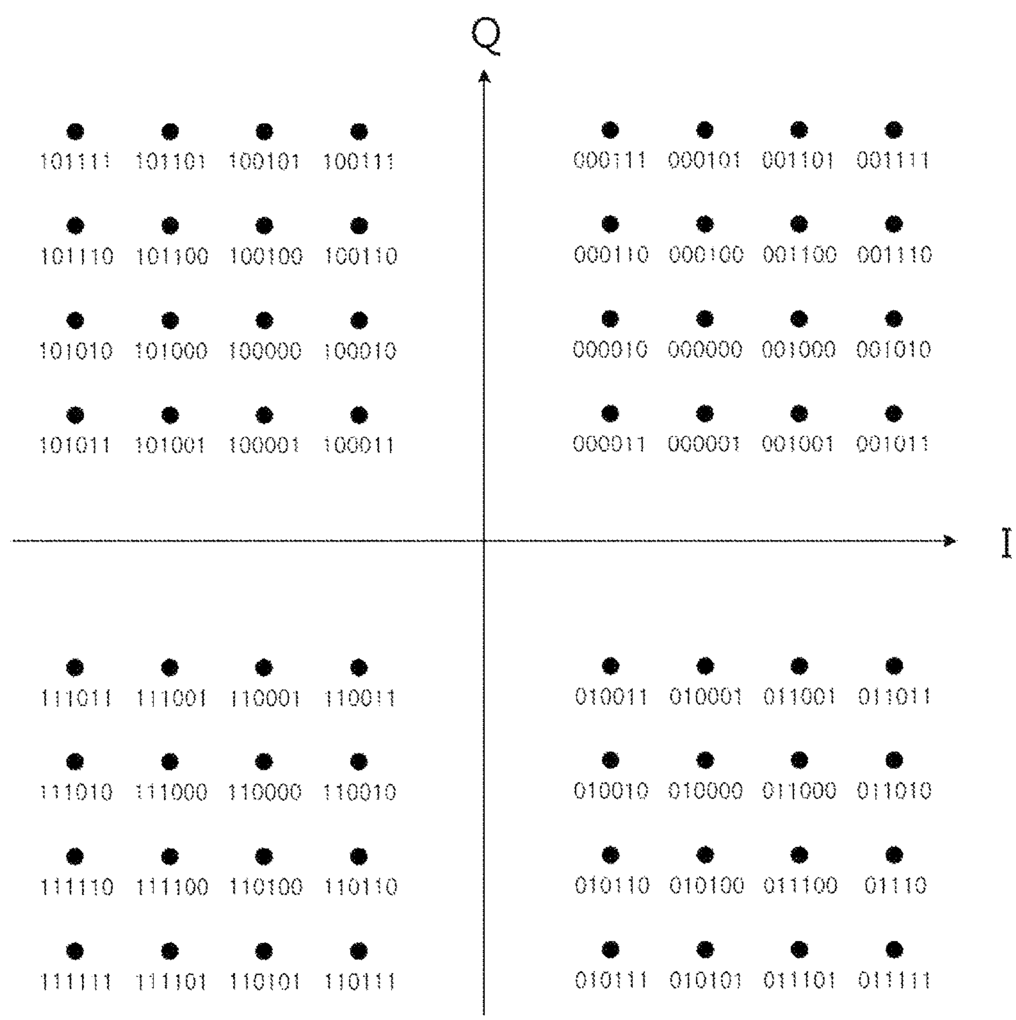
FIG. 12 illustrates a result of combining a QPSK constellation and a 16-QAM constellation based on the method in FIG. 11.

FIG. 12 illustrates a result of combining a QPSK constellation (high-power UE) and a 16-QAM constellation (low-power UE) based on the method in FIG. 11.

When signals are transmitted to a NOMA pair based on the NOMA constellation configured as described above, UE1 can operate as follows.

1. In the case of the ML receiver: The UE 1 can estimate a symbol closest to a received symbol as a transmitted symbol per symbol (or per bit) based on information the combined constellation.

2. In the case of the SIC receiver:

(1) The low-power UE can cancel a signal for the high-power UE from a received signal by estimating the signal for the high-power UE;

(2) The constellation of the low-power UE can be determined according to positions of high-power UE symbols on constellation thereof. For example, the low-power UE can create a new constellation with the same modulation order by combining the bit sequence of the estimated symbols (high-power UE) and the bit sequence of the constellation used by the low-power UE (e.g., standard constellation) according to an embodiment of the present invention and then obtain its own signal. For example, (i) when the combined constellation as shown in FIG. 10 is created, the low-power UE can assume that the estimated high-power UE's symbol is located in the first quadrant. Thereafter, the low-power UE can perform demodulation on the signal for itself by assuming that its bit sequence of the QPSK constellation points is defined from the first to fourth quadrants in the following order: 11, 01, 00 and 10 (i.e., the least significant two bits in the first quadrant of the combined constellation); and (ii) when the low-power UE recognizes that the symbol is located in the second quadrant by estimating the high-power UE signal in the same manner as described above, the low-power UE can assume that its bit sequence is defined from the first to fourth quadrants in the following order: 01, 11, 10, and 00.

(3) The receiver type can be included in a UE category. For example, the UE category can be divided into ML only, SIC only and ML+SIC according to the receiver type supported by a UE. When the UE category is defined according to the receiver type as described above and then reported to an eNB, the eNB can determine a constellation type based on the reported UE category. For example, (i) if the UE category is the ML only, the eNB may generate signals by limiting a constellation for the NOMA pair to which the corresponding UE belongs to the gray-type constellation. In this case, the UE may also be configured to perform reception operation for the gray-type constellation only; (ii) in the case of the NOMA pair including a UE corresponding to the SIC only, it is possible to reduce complexity using the non-gray-type constellation as shown in FIG. 9; and (iii) in the case of a UE supporting both the ML and SIC, the proposed receiver type in according with power offset can be applied together with the constellation in accordance with the power offset. Since SIC-based reception operation has significant effects on the low-power UE, the constellation type may be determined based on the UE category to which the low-power UE belongs.

Embodiment 2

When two modulation symbols generated by respectively modulating two independent information bit sequences are combined as described above, adjacent modulation symbols may have two or more different bits as shown in FIG. 9. In the above embodiments, the method for maintaining gray mapping by scrambling one bit sequence through an operation (e.g., XNOR) between the two bit sequences has been described to solve the problem. This method can be applied to not only generate a constellation but also maintain the gray mapping by changing a bit sequence mapped to the constellation.

Figure 13:
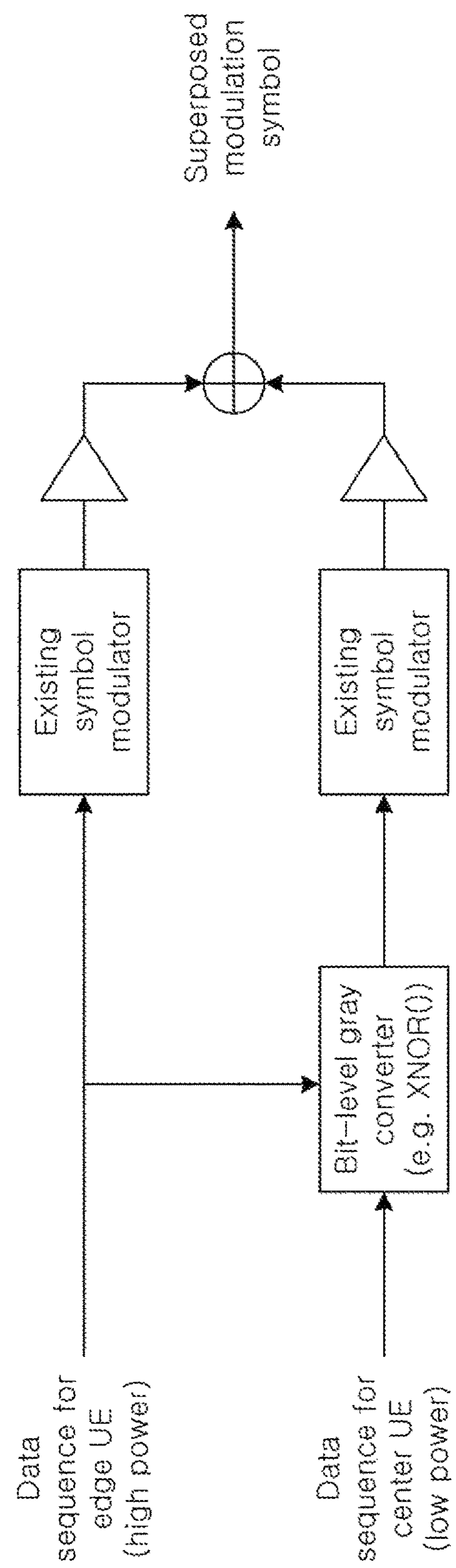
FIG. 13 is a diagram for explaining a superposed modulation symbol and a bit sequence for gray mapping according to an embodiment of the present invention.

FIG. 13 is a diagram for explaining a superposed modulation symbol and a bit sequence for gray mapping according to an embodiment of the present invention.

Referring to FIG. 13, a bit sequence of a low-power UE can be converted by a bit sequence of a high-power UE (e.g., Equation 12). Specifically, symbol-level mapping may be performed on a bit sequence outputted from a bit-level gray converter by a modulation mapper corresponding to modulation order of each UE (e.g., a modulation mapper defined in the 3GPP standard). Thereafter, a final modulation symbol may be generated by adding modulation symbols of individual UEs.

Figure 14:
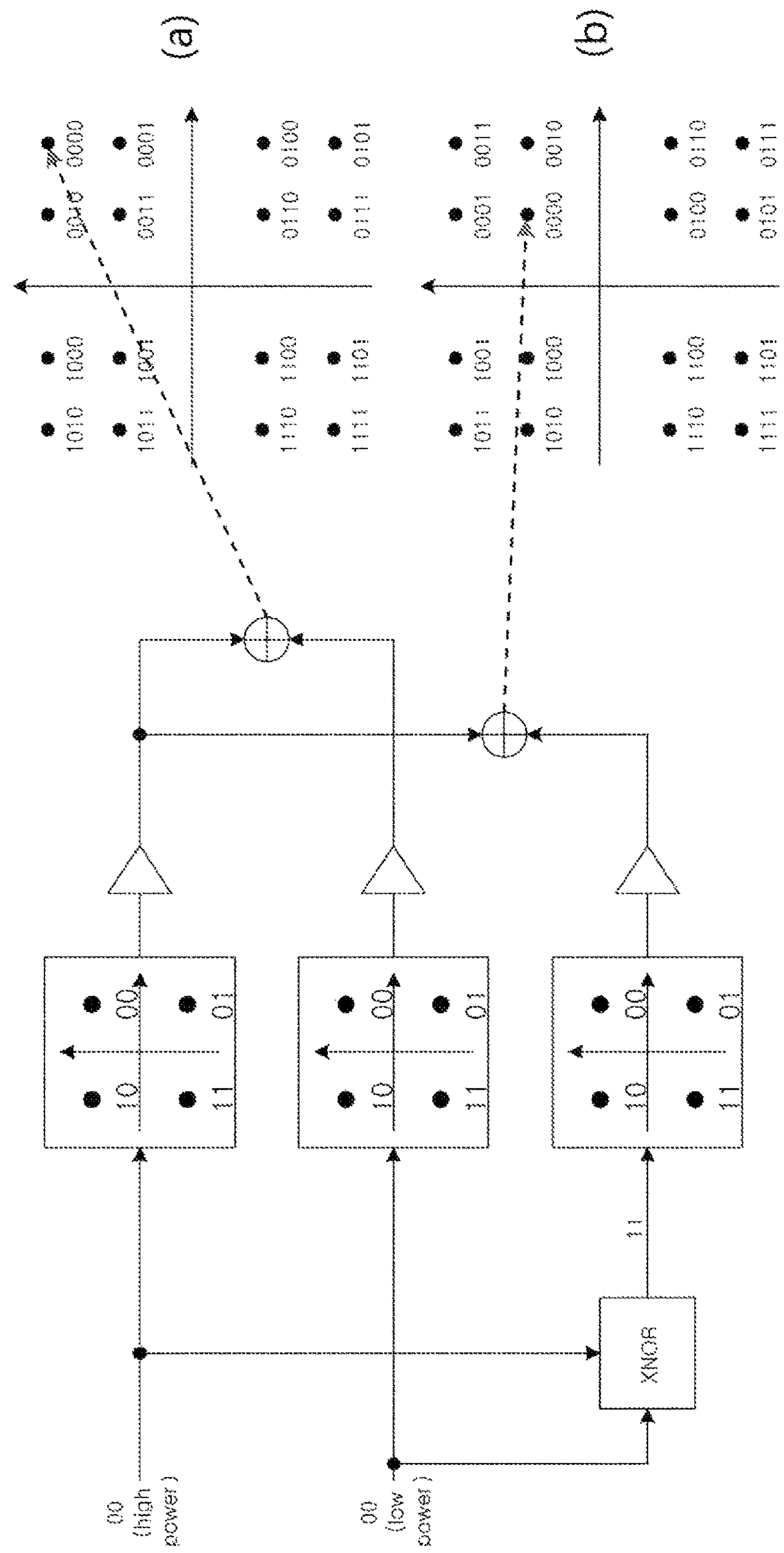
FIG. 14 is a diagram for explaining superposition of QPSK symbols of a NOMA pair according to an embodiment of the present invention.

FIG. 14 is a diagram for explaining superposition of QPSK symbols of a NOMA pair according to an embodiment of the present invention.

As shown in FIG. 14, symbols generated through simple superposition are mapped to a non-gray-mapped constellation (a) and symbols generated through the bit-level gray converter proposed in the present embodiment are mapped to a gray-mapped constellation (b).

In order for the receiver to obtain a bit sequence of each constellation point, the operation method for the bit-level gray converter can be defined in the standard.

Alternatively, when the XNOR operation is applied to the QPSK+QPSK combination as shown in FIG. 14, final 16 bit sequences of individual constellation points respectively match bit sequences of individual 16QAM constellation points defined in the standard. Thus, it is possible to assume that a bit sequence of each constellation point of a superposed constellation is equal to the bit sequence of each of the 16QAM constellation points.

In the present embodiment, the bit-level gray converter may be configured differently according to modulation order of the high-power UE and constellation points thereof.

When among two signals to be superposed, a signal with high power has modulation order of 2 (i.e., QPSK) and the other signal with low power has modulation order of m, output from the bit-level gray converter shown in FIG. 14 can be generalized as follows.

Assuming that the bit sequence of the high-power signal is $a_1a_2$ and the bit sequence of the low-power signal is $b_1 b_2 \ldots b_m$, a sequence outputted from the bit-level gray converter $c_1c_2 \ldots c_m$ can be expressed as shown in Equation 13.

$$c_1 = XNOR(a_1, b_1)$$
$$c_2 = XNOR(a_2, b_2)$$
$$c_3 = b_3$$
$$\ldots$$
$$c_m = b_m$$
[Equation 13]

The output sequence of the bit-level gray converter $c_1 c_2 \ldots c_m$ may be combined with the high-power signal bit sequence $a_1a_2$ to configure a (m+2) length of bit sequence (e.g., a bit sequence to be mapped to the NOMA constellation). For example, the (m+2) length of bit sequence can be configured as $a_1\ a_2\ c_1\ c_2 \ldots c_m$. Although in the present embodiment, it is assumed that the output sequence of the bit-level gray converter is located at the least significant m bits, the bit sequence may be located at the most significant m bits (e.g., $c_1c_2 \ldots c_m\, a_1a_2$).

As another method for configuring the gray-mapped constellation, the constellation of the low-power UE can be changed according to the bit sequence of the high-power UE. For example, FIG. 15 illustrates patterns for changing a constellation of a low-power UE when the constellation of the low-power is the QPSK.

Figure 15:
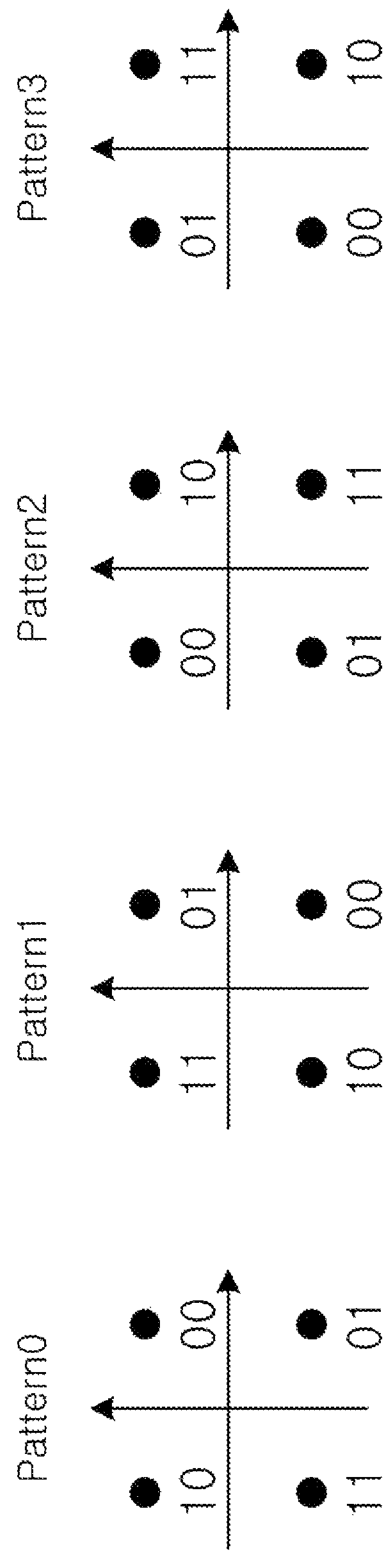
FIG. 15 illustrates patterns for changing a constellation according to an embodiment of the present invention.

Referring to FIG. 15, pattern 0 is the QPSK constellation defined in the standard, pattern 1 is obtained by rotating the pattern 0 in the vertical direction, pattern 2 is obtained by rotating the pattern 0 in the horizontal direction, and pattern 3 is obtained by rotating the pattern 0 in both the vertical and horizontal directions. Although in the present embodiment, it is assumed that the low-power UE has modulation order of 2, the patterns 0 to 3 can be obtained in the case of a high modulation order in the same manner.

When modulation order of the high-power UE is 2, the method for changing the constellation of the low-power UE could be interpreted as to mean that a pattern of the modulation mapper for the low-power UE signal is changed instead of the aforementioned bit-level gray converter. However, the result obtained from the bit-level gray converter is similar to that obtained by changing the constellation of the low-power UE (FIG. 15 shows the patterns obtained by performing the XNOR operation in the gray converter and when other operations except the XNOR are used in the gray converter, these patterns may be changed).

The transmitter may generate a symbol for the low-power UE after determining a pattern of the low-power UE according to the bit sequence of the high-power UE. The pattern of the low-power UE per bit sequence of the high-power UE can be determined as shown in Table 1 or 2.

Table 1 shows the pattern of the low-power UE per bit sequence of the high-power UE when the modulation order of the high-power UE is 2 (i.e., QPSK).

TABLE 1

| Bit sequence of high power UE | Pattern of low power UE |
|---|---|
| 00 | Pattern3 |
| 01 | Pattern1 |
| 10 | Pattern2 |
| 11 | Pattern0 |

Table 2 shows the pattern of the low-power UE per bit sequence of the high-power UE when the modulation order of the high-power UE is 4 (i.e., 16QAM).

TABLE 2

| Bit sequence of high power UE | Pattern of low power UE |
|---|---|
| 0000 | Pattern0 |
| 0001 | Pattern1 |
| 0010 | Pattern2 |
| 0011 | Pattern3 |
| 0100 | Pattern1 |
| 0101 | Pattern0 |
| 0110 | Pattern3 |
| 0111 | Pattern2 |
| 1000 | Pattern2 |
| 1001 | Pattern3 |
| 1010 | Pattern0 |
| 1011 | Pattern1 |
| 1100 | Pattern3 |
| 1101 | Pattern2 |
| 1110 | Pattern1 |
| 1111 | Pattern0 |

After determining the constellation pattern of the low-power UE according to the bit sequence of the high-power UE, the transmitter may perform transmission by generating and adding a symbol of each UE. In this case, the final combined constellation may be in the form of the gray-mapped constellation.

Embodiment 3

The method for generating a final constellation for two superposed signals as the gray-type constellation has been described. In addition, it has been proposed to perform the bit-level gray converting using the XNOR operation when modulation order of a high-power signal is 2 (i.e., QPSK).

Hereinafter, a description will be given of a method for performing the bit-level gray converting by generalizing the aforementioned embodiments.

For convenience of description, the following notation is used:

(i) M and N: modulation order of high-power and low-power signals;

(ii) $a_1, a_2, \ldots, a_M$: a bit sequence corresponding to a modulation symbol of the high-power signal;

(iii) $b_1, b_2, \ldots, b_N$: a bit sequence corresponding to a modulation symbol of the low-power signal; and (iv) $c_1, c_2, \ldots, c_N$: a bit sequence corresponding to a modulation symbol of a signal converted from the low-power signal (i.e., a sequence outputted from the gray converter).

In addition, a bit sequence mapped to NOMA constellation points may be denoted as "$a_1, a_2, \ldots, a_M\, c_1, c_2, \ldots, c_N$" or "$c_1, c_2, \ldots, c_N\, a_1, a_2, \ldots, a_M$".

According to the bit-level gray converter proposed in the present embodiment, not only the existing modulation mapper can be reused for each of the high-power and low-power signal (by changing the bit sequence of the low-power signal) but also a bit difference between adjacent symbols in the final combined constellation can be maintained as 1 bit by superposing modulation symbols of the individual signals. To this end, the bit-level gray converter receives as an input a bit sequence of each of the high-power and low-power signals in a modulation symbol basis and then changes and outputs the bit sequence of the low-power signal.

Figure 16:
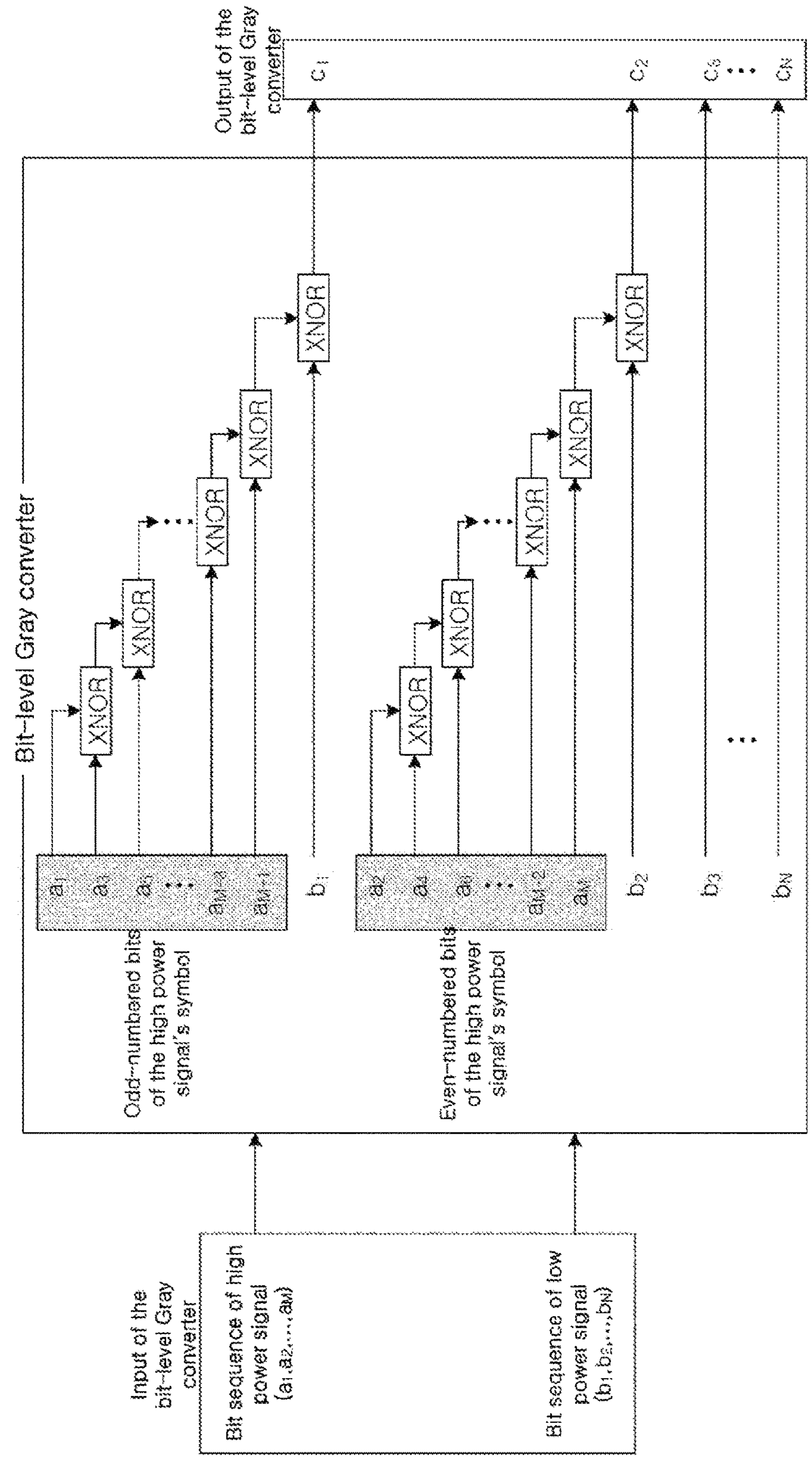
FIG. 16 illustrates a bit-level gray converter according to an embodiment of the present invention.

FIG. 16 illustrates a bit-level gray converter according to an embodiment of the present invention.

Hereinafter, operation of the bit-level gray converter will be described by assuming that modulation order of both high-power and low-power signals is 4 (i.e., 16QAM).

Since M is 4 (M=4), a bit sequence constituting each modulation symbol of the high-power signal can be denoted as $a_1, a_2, a_3, a_4$ ($a_1$ is the MSB). In addition, since N is also 4 (N=4), a bit sequence constituting each modulation symbol of the low-power signal can be denoted as $b_1, b_2, b_3, b_4$ ($b_1$ is the MSB).

After the bit sequence of each signal is inputted to the bit-level gray converter, the bit-level gray converter can operate in the following order:

(i) the bit sequence of the high-power signal is divided into odd-indexed bits and even-indexed bits (assume that the index of the MSB is 1);

(ii) two bits with lower indices are selected in the odd-indexed group and the XNOR operation is performed between the two bits. Thereafter, the XNOR operation is performed again between the XNOR operation result and the next bit in the odd-indexed group. The XNOR operation is repeated until the last bit in the odd-indexed group. In the even-indexed group, the XNOR operation is repeated in the same manner. For example, in the case of 16QAM-16QAM, $XNOR(a_1, a_3)$ and $XNOR(a_2, a_4)$ operations are respectively performed in the odd-indexed and even-indexed groups. As another example, if the modulation order of the high-power signal is 6 (M=6), final operation results in both groups can be expressed as $XNOR\{XNOR(a_1,a_3),a_5\}$ and $XNOR\{XNOR(a_2,a_4),a_6\}$, respectively;

(iii) the XNOR operation is performed between each of the XNOR operation results (in both the odd-indexed and even-indexed groups) for the high-power signal and each of $b_1$ and $b_2$ of the low-power signal. The XNOR operation results are used to configure $c_1$ and $c_2$ of the bit-level gray converter output. If the modulation order N of the low-power signal is higher than 2, $b_3, \ldots, b_N$ can be used to configure $c_3, \ldots, c_N$ without any changes;

(iv) when the modulation order of both the high-power and low-power signals is 4 (i.e., 16QAM), the final output of the bit-level gray converter $c_1$, $c_2$, $c_3$, $c_4$ can be expressed as shown in Equation 14; and $$c_1=XNOR(XNOR(a_1,a_3),b_1)$$

$$c_2=XNOR(XNOR(a_2,a_4),b_2)$$

$$c_3=b_3$$

$$c_4=b_4 \quad \text{[Equation 14]}$$

(v) the NOMA transmitter obtains a first modulation symbol by applying the conventional 16QAM modulation to $a_1, \ldots, a_4$ and a second modulation symbol by applying the conventional 16QAM modulation to $c_1, \ldots, c_4$. In addition, the transmitter applies high and low power to the first and second modulation symbol, respectively. Thereafter, the transmitter perform transmission by superposing the first and second modulation symbols. In this case, precoding can be applied to each symbol or the superposed symbol.

A UE that receives the signal transmitted as described above can assume that bit-symbol mapping is performed according to the conventional mapping scheme corresponding to a composite modulation order. Here, the composite modulation order may be a product of the modulation order of the high-power signal and the modulation order of the low-power signal.

Figure 17:
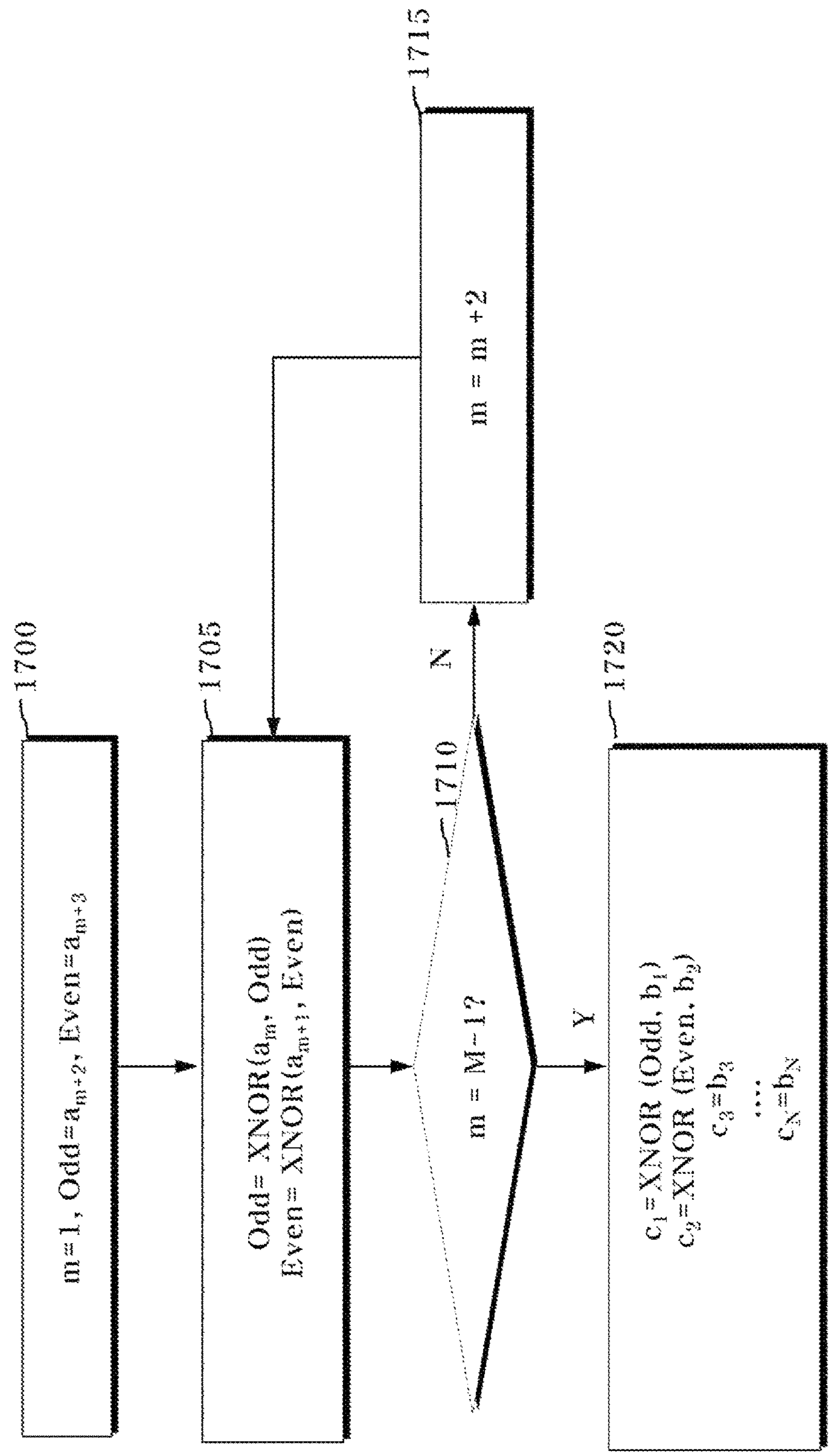
FIG. 17 is a flowchart for explaining operation of a bit-level gray converter according to an embodiment of the present invention.

FIG. 17 is a flowchart for explaining operation of a bit-level gray converter according to an embodiment of the present invention. FIG. 17 is merely an example for explaining the operation of the bit-level gray converter shown in FIG. 16 and the operation of the bit-level gray converter can be implemented in various ways.

First, the bit-level gray converter sets m to 1 and then initialize a parameter for the odd-indexed group, Odd to $a_3$ and a parameter for the even-indexed group, Even to $a_4$ [1700].

The bit-level gray converter sets the Odd parameter to a result of XNOR ($a_m$, Odd) and the Even parameter to a result of XNOR ($a_{m+i}$, Even) [1705].

The bit-level gray converter determines whether the current value of m is equal to a value of (the high-power signal's modulation order M−1) [1710].

If m is not equal to (M−1), the bit-level gray converter increases m by 2 and then repeats the XNOR operation [1705].

If m is equal to (M−1), the bit-level gray converter sets $c_1$ and $c_2$ to XNOR (Odd, $b_1$) and XNOR (Even, $b_2$), respectively [1720]. The remaining bits $c_i$ may be set to be equal to $b_i$ (where i is a positive integer satisfying $2<i<N+1$).

After cancelling the high-power signal, the codeword-level SIC receiver can perform decoding on the low-power signal. In this case, if the gray-mapping is applied to the composite constellation, the constellation of the low-power signal, which is obtained by cancelling the high-power signal, may have different arrangements (or patterns) according to the bit sequence of the high-power signal.

In this case, the codeword-level SIC receiver can grasp the bit-symbol mapping of the low power signal, which is obtained after cancelling the high-power signal, through the following operations:

(i) when decoding of the high-power signal is successful and the bit sequence of the modulation symbol of the high-power signal is $a_1, a_2, \ldots, a_m$, the SIC receiver repeatedly performs the XNOR operation on both the even-indexed and odd-indexed groups similar to the aforementioned operation of the bit-level gray converter; and (ii) the SIC receiver performs the XNOR operation between 2 bits acquired through the operation (i) (e.g., $d_{odd}$, $d_{even}$) and the most significant 2 bits of each constellation point of the constellation corresponding to the modulation order of the low-power signal and then obtains a changed constellation by inserting the operation result into first 2 bits of the corresponding constellation.

Figure 18:
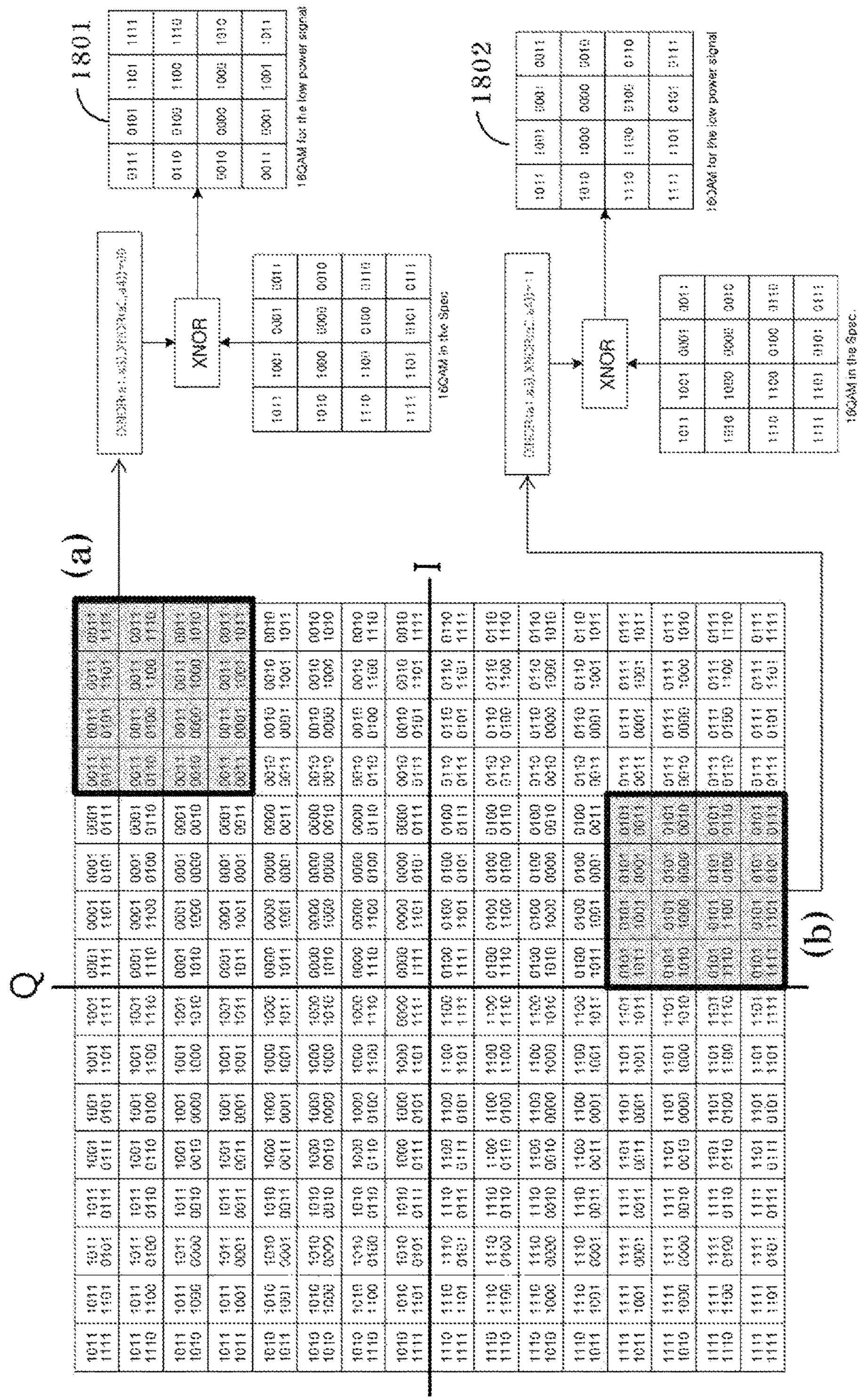
FIG. 18 illustrates a NOMA constellation according to an embodiment of the present invention.

FIG. 18 illustrates a NOMA constellation according to an embodiment of the present invention. In FIG. 18, it is assumed that a modulation scheme of high-power and low-power signals is 16QAM and the NOMA operation is performed using the aforementioned bit-level gray converter.

A UE can recognize that a bit sequence of the high-power signal is 0011 by performing codeword-level IC (CWIC) (in area (a) of FIG. 18). The UE obtains an XNOR operation result of (XNOR(0,1), XNOR(0,1))=(0,0) using the obtained bit sequence of 0011. Thereafter, the UE performs the XNOR operation of (0,0) and the most significant 2 bits of a reference standard 16QAM constellation (e.g., standard constellation). By inserting the XNOR operation result into the most significant 2 bits of the 16QAM constellation, the UE can obtain a changed 16QAM constellation 1801 for the low-power signal.

When the high-power signal is 0101 (in area (b) of FIG. 18), the UE can obtain a changed 16QAM constellation 1802 for the low-power signal in the same manner as described above.

As seen from FIG. 18, the reference 16QAM constellation can be converted into either the 16 QAM constellation 1801 or the 16 QAM constellation 1802 depending on whether the bit sequence of the high-power signal is located in the area (a) or (b).

The aforementioned embodiments can be implemented in various ways. For example, it could be interpreted as follows. Assuming that modulation order of a high-power UE is M and modulation order of a low-power UE is N, a NOMA constellation may have modulation order of M*N, where there are $(M*N)^2$ constellation points. In particular, when the above-described bit-level gray converter is used in configuring a NOMA configuration, adjacent constellation points may have different single-digit bits.

In addition, when the bit-level gray converter is implemented based on the XNOR operation, the NOMA constellation may generate the same bit-sequence mapping result as that of the constellation with modulation order of M*N defined in the standard. However, since an average power value of the high-power UE is different from that of the low-power UE, spacing between standard constellation points may be different from that between NOMA constellation points.

The NOMA constellation may have $M^2$ constellation point groups, each of the $M^2$ constellation point groups having $N^2$ constellation points. In addition, an (M+N) length of bit sequence is mapped to each constellation point. In the case of $N^2$ constellation points belonging to the same constellation point group, upper M bits are the same and lower N bits are different.

In this case, spacing between the $M^2$ constellation point groups may be adjusted in consideration of average power of the high-power UE, $2b^2$ (e.g., spacing between groups=d1*b, where d1 is spacing between constellation points of a constellation with modulation order of M). In addition, spacing between the $N^2$ constellation points belonging to the same group may be adjusted in consideration of average power of the low-power UE, $2a^2$ (e.g., spacing between constellation points=d2*a, where d2 is spacing between constellation points of a constellation with modulation order of N).

Meanwhile, when bit-sequence mapping for the NOMA constellation points is maintained to be identical to a modulation mapping scheme defined in the standard (e.g., when the bit-level gray converter uses the XNOR operation), values of I and Q can be obtained from a modulation mapping table defined in the standard and a final NOMA modulation symbol x can be expressed as shown in Equation 15.

$$x=I*f1+jQ*f2 \qquad \text{[Equation 15]}$$

In Equation 15, f1 and f2 are values or functions determined by at least one of a power-related parameter of the high-power UE (or parameter 1 signaled from the eNB) and a power-related parameter of the low power UE (or parameter 2 signaled from the eNB).

Meanwhile, from the perspective of the receiver, when the bit-sequence mapping for the NOMA constellation points is identical to the modulation mapping scheme defined in the standard, the low-power UE may be considered to perform sampling of the $N^2$ constellation points (or constellation groups) on the NOMA constellation (or constellation with the modulation order of M*N). For example, sampling may be performed on the $N^2$ constellation points among the $(M*N)^2$ constellation points. In this case, the $N^2$ constellation points to be sampled may be determined based on the signal for the high-power UE. For example, sampling may be performed on $N^2$ constellation points belonging to a group where the signal for the high-power UE is detected among the $M^2$ constellation point groups. A UE can demodulate and decode the signal for the low-power UE by using only lower N bits in a bit sequence of the sampled $N^2$ constellation points (or discarding upper M bits).

Figure 19:
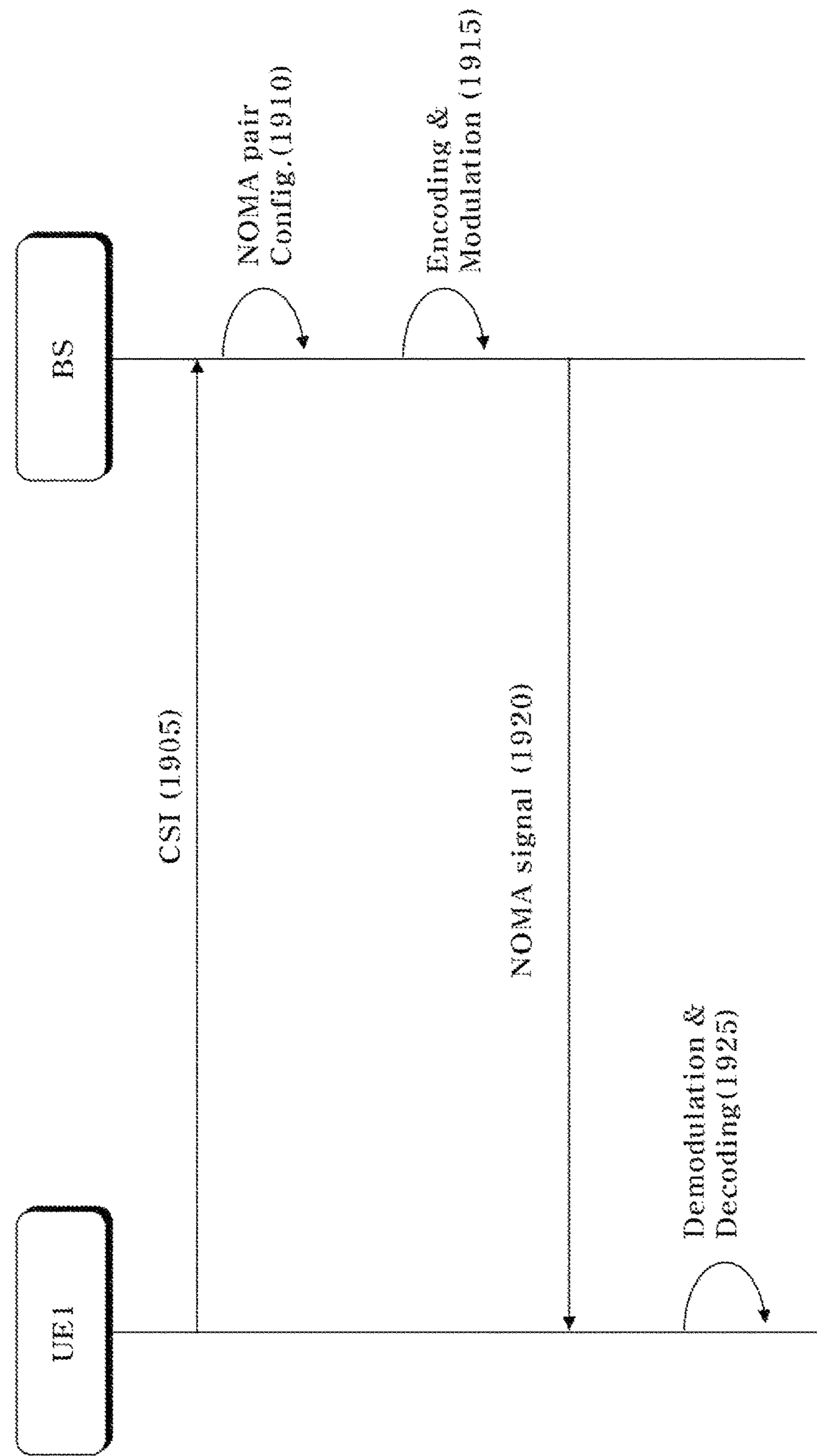
FIG. 19 is a diagram for explaining a method for transmitting or receiving a signal according to an embodiment of the present invention.

FIG. 19 is a diagram for explaining a method for transmitting or receiving a signal according to an embodiment of the present invention. To avoid redundant description, the aforementioned features will not be described herein. In FIG. 19, a second UE is not illustrated for simplicity.

Referring to FIG. 19, a first UE transmits channel state information (CSI) to an eNB [1905]. Although not shown in the drawing, the second UE may also transmit CSI to the eNB.

The eNB may configure the first and second UEs as a NOMA pair. In this case, the NOMA pair may be configured based on the CSI received from the first and second UEs. For example, the eNB may configure the first and second UEs as the NOMA pair by determining whether the same beamforming is applied to the first and second UEs. In addition, when the first and second UEs belong to the same NOMA pair, the same beam pattern may be applied and a difference between downlink transmit power of the first and second UEs may be equal to or greater than a predetermined threshold.

The eNB may determine a NOMA constellation by considering downlink transmit power and modulation order of each the first and second UEs belonging to the same NOMA pair. In this case, bit sequences of adjacent NOMA constellation points in the NOMA constellation may be configured to have different single-digit bits. In addition, complex coordinates (I, Q) of the NOMA constellation points are determined based on a combination of the downlink transmit power for the first UE and the downlink transmit power for the second UE.

lower N bits ($c_1c_2 \ldots c_N$) (e.g., a result obtained by changing a bit sequence of the first UE) in a bit sequence with a length of (M+N), which is mapped to each of the NOMA constellation points, can be defined as shown in Equation 16. However, according to another embodiment of the present invention, the bit sequence $c_1c_2 \ldots c_N$ may be used as upper N bits of the (M+N)-length bit sequence.

$$c_1=(((a_1 \otimes a_3) \otimes a_5) \ldots \otimes a_{M-1}) \textcircled{z}\, b_1$$

$$c_2=(((a_2 \otimes a_4) \otimes a_6) \ldots \otimes a_M) \textcircled{z}\, b_2$$

$$c_i=b_i (3 \le i \le N) \qquad \text{[Equation 16]}$$

In Equation 16, '$\otimes$' and '$\textcircled{z}$' are predetermined bit-wise operations, '$b_1b_2 \ldots b_N$' is a bit sequence for the first UE, '$a_1a_2 \ldots a_M$' is a bit sequence for the second UE, 'M' is modulation order of the second UE, and 'N' is modulation order of the first UE. In addition, '$\otimes$' may be an exclusive OR (XOR) or Not exclusive OR (XNOR) operation and '$\textcircled{z}$' may be the exclusive OR (XOR) or Not exclusive OR (XNOR) operation. '$\otimes$' and '$\textcircled{z}$' may be identical or different bit-wise operations. The remaining M bits in the (M+N)-length bit sequence may be configured to be identical to the bit sequence of the second UE, '$a_1a_2 \ldots a_M$'.

The NOMA constellation includes $M^2$ constellation point groups, each having $N^2$ constellation points. In this case, 'N' may be the modulation order of the first UE and 'M' may be the modulation order of the second UE. Spacing between $N^2$ constellation points belonging to the same constellation point group may be determined based on the downlink transmit power for the first UE and spacing between centers of the $M^2$ constellation point groups may be determined based on the downlink transmit power of the second UE.

The eNB encodes and modulates a NOMA signal obtained by superposing the signals for the first and second UEs using the NOMA constellation [1915].

Thereafter, the eNB transmits the NOMA signal [1920].

Meanwhile, the eNB may signal, to a UE with lower downlink transmit power of the first and second UEs, information on modulation order and downlink transmit power of the other UE with higher downlink transmit power.

The first UE demodulates and decodes the NOMA signal [1925]. For example, the first UE performs demodulation of the signal for the first UE from the NOMA signal using at least part of the NOMA constellation configured in consideration of the downlink transmit power and modulation order for the second UE.

In addition, the first UE may perform the demodulation in a maximum likelihood (ML) manner by constructing the entirety of the NOMA constellation or perform the demodulation in a successive interference cancellation (SIC) manner by reconstructing constellation points corresponding to a part of the NOMA constellation.

Meanwhile, the first UE may transmit information about a type of the receiver used by itself to the eNB. Similarly, may transmit information about a type of the receiver used by itself to the eNB. The receiver type may include at least one of a maximum likelihood (ML) type and a successive interference cancellation (SIC) type. In addition, the eNB may determine information to be transmitted to the first UE and/or second UE (e.g., peer UEs that belong to the same NOMA pair) based on the information about the receiver type received from the first UE and/or second UE.

The first UE may demodulate the signal for the second UE using a first constellation corresponding to the modulation order for the second UE. The first UE may cancel the signal for the second UE from the NOMA signal using a result obtained by demodulating the signal for the second UE. Thereafter, the first UE may demodulate and decode the signal for the first UE using a residual signal after cancelling and a second constellation corresponding to the modulation order for the first UE.

The first UE may perform the XNOR operation between results of the XNOR operation between odd-indexed bits of the bit sequence of the second UE and respective first bits of bit sequences of a reference constellation corresponding to the modulation order of the first UE. In addition, the first UE may perform the XNOR operation between results of the XNOR operation between even-indexed bits of the bit sequence of the second UE and respective second bits of the bit sequences of the reference constellation. The first UE can generate a second constellation by inserting results of the XNOR operation for the respective first bits and results of the XNOR operation for the respective second bits into the reference constellation.

Apparatus According to Embodiments of the Present Invention

Figure 20:
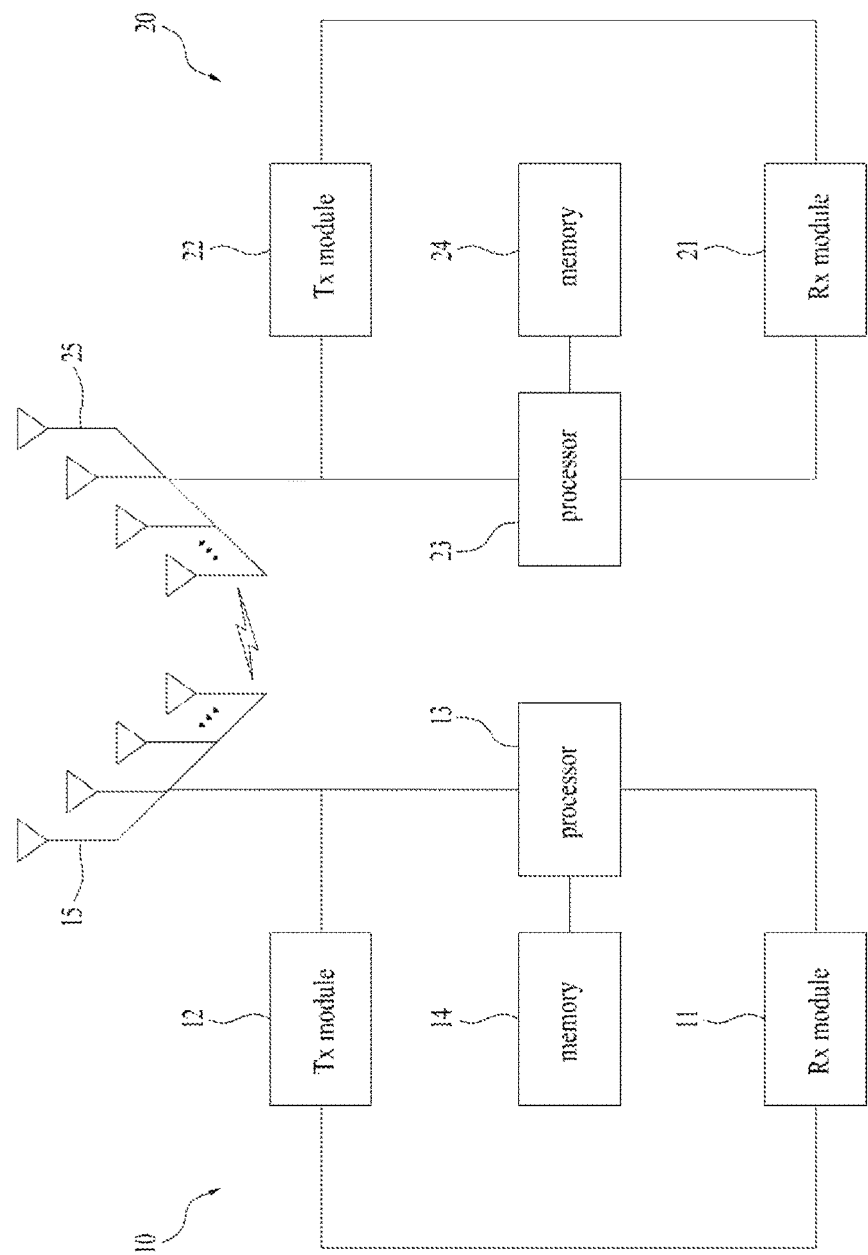
FIG. 20 is a block diagram illustrating configurations of transmitting and receiving point devices according to an embodiment of the present invention.

FIG. 20 is a diagram for a user equipment and a transmission point according to one embodiment of the present invention. The user equipment and the transmission point shown in FIG. 20 can perform the aforementioned embodiments.

Referring to FIG. 20, a transmission point 10 can include a reception module 11, a transmission module 12, a processor 13, a memory 14 and a plurality of antennas 15. A plurality of the antennas 15 correspond to a transmission point supporting MIMO transmission and reception. The reception module 11 can receive various signals, data and information from the user equipment in UL. The transmission module 12 can transmit various signals, data and information to the user equipment in DL. The processor 13 can control overall operation of the transmission point 10.

The processor 13 of the transmission point 10 can process items necessary for each of the aforementioned embodiments.

Besides, the processor 13 of the transmission point 10 performs a function of calculating and processing information received by the transmission point 10, information to be transmitted to the external and the like. The memory 14 can store processed information for prescribed time and can be replaced with such a configuration element as a buffer (not depicted).

Referring to FIG. 20, a user equipment 20 can include a reception module 21, a transmission module 22, a processor 23, a memory 24 and a plurality of antennas 25. A plurality of the antennas 25 correspond to a UE supporting MIMO transmission and reception. The reception module 21 can receive various signals, data and information from the base station in DL. The transmission module 22 can transmit various signals, data and information to the base station in UL. The processor 23 can control overall operation of the user equipment 1420.

The processor 23 of the user equipment 20 can process items necessary for each of the aforementioned embodiments.

Besides, the processor 23 of the user equipment 20 performs a function of calculating and processing information received by the user equipment 1420, information to be transmitted to the external and the like. The memory 1424 can store processed information for prescribed time and can be replaced with such a configuration element as a buffer (not depicted).

For a concreate configuration of the user equipment and the transmission point, items mentioned earlier in various embodiments of the present invention can be independently applied or two or more embodiments can be applied at the same time. For clarity, explanation on contents overlapped with the aforementioned contents is omitted.

And, in explaining FIG. 20, if a relay becomes a downlink transmission entity from the transmission point 10 or an uplink reception entity to the transmission point, or the relay becomes a downlink reception entity from the UE or an uplink transmission entity to the UE, the principle of the present invention can also be identically applied to the relay via various embodiments of the present invention.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

What is claimed is:

1. A method for receiving a signal by a first user equipment (UE) in a wireless communication system supporting non-orthogonal multiple access (NOMA), the method comprising:
   - receiving a NOMA signal in which a signal for the first UE and a signal for a second UE are superposed, the first UE and the second UE belonging to a same NOMA pair; and
   - demodulating the signal for the first UE from the NOMA signal based on at least part of a NOMA constellation configured based on downlink transmit power and modulation order for the second UE,
   - wherein only a bit is differently configured between bit sequences of NOMA constellation points adjacent to each other in the NOMA constellation,
   - wherein complex coordinates (I, Q) of the NOMA constellation points are determined based on a combination of downlink transmit power for the first UE and downlink transmit power for the second UE, and
   - wherein upper or lower N bits ($c_1c_2 \ldots c_N$) in a bit sequence with a length of (M+N), which is mapped to each of the NOMA constellation points, are defined according to the following equation:

$$c_1=(((a_1 \otimes a_3) \otimes a_5) \ldots \otimes a_{M-1}) \textcircled{z}\, b_1$$

$$c_2=(((a_2 \otimes a_4) \otimes a_6) \ldots \otimes a_M) \textcircled{z}\, b_2$$

$$c_i=b_i (3 \le i \le N), \quad \text{[Equation]}$$

- where '⊗' and 'ⓩ' are identical or different predetermined bit-wise operations, 'b1b2 . . . bN' is a bit sequence for the first UE, 'a1a2 . . . aM' is a bit sequence for the second UE, 'M' and 'N' are integers, 'M' is modulation order of the second UE, and 'N' is a number of bits corresponding to modulation order of the first UE.

2. The method of claim 1, wherein the demodulating the signal for the first UE comprises either demodulating the signal for the first UE in a maximum likelihood (ML) manner by constructing an entirety of the NOMA constellation or demodulating the signal for the first UE in a successive interference cancellation (SIC) scheme by reconstructing constellation points corresponding to a part of the NOMA constellation.

3. The method of claim 1, wherein remaining M bits in the (M+N)-length bit sequence are configured to be identical to the bit sequence of the second UE, 'a1a2 . . . aM', and
   - wherein the predetermined bit-wise operations include at least one of an exclusive OR (XOR) operation and a not exclusive OR (XNOR) operation.

4. The method of claim 1, further comprising:
   - demodulating the signal for the second UE using a first constellation corresponding to the modulation order for the second UE;
   - cancelling the signal for the second UE from the NOMA signal using a result obtained by demodulating the signal for the second UE; and
   - demodulating and decoding the signal for the first UE using a residual signal after cancelling and a second constellation corresponding to modulation order for the first UE.

5. The method of claim 4, further comprising:
   - performing a not exclusive OR (XNOR) operation between results of the XNOR operation of odd-indexed bits of a bit sequence of the second UE and respective first bits of bit sequences of a reference constellation corresponding to the modulation order of the first UE;
   - performing the XNOR operation between results of the XNOR operation of even-indexed bits of the bit sequence of the second UE and respective second bits of the bit sequences of the reference constellation; and
   - generating a second constellation by inserting results of the XNOR operation for the respective first bits and results of the XNOR operation for the respective second bits into the reference constellation.

6. The method of claim 1, wherein the NOMA constellation includes M2 constellation point groups, each having N2 constellation points, and
   - wherein spacing between N2 constellation points belonging to a same constellation point group is determined based on the downlink transmit power for the first UE and spacing between centers of the M2 constellation point groups is determined based on the downlink transmit power of the second UE.

7. The method of claim 1, further comprising:
   - transmitting information on a receiver type of the first UE to a base station,
   - wherein the receiver type includes at least one of a maximum likelihood (ML) type and a successive interference cancellation (SIC) type.

8. A first user equipment (UE) for receiving a signal in a wireless communication system supporting non-orthogonal multiple access (NOMA), the first UE comprising:
   - a receiver configured to receive a NOMA signal in which a signal for the first UE and a signal for a second UE are superposed, the first UE and the second UE belonging to a same NOMA pair; and
   - a processor configured to demodulate the signal for the first UE from the NOMA signal based on at least part of a NOMA constellation configured based on downlink transmit power and modulation order for the second UE,
   - wherein only a bit is differently configured between bit sequences of NOMA constellation points adjacent to each other in the NOMA constellation,
   - wherein complex coordinates (I, Q) of the NOMA constellation points are determined based on a combination of downlink transmit power for the first UE and downlink transmit power for the second UE, and
   - wherein upper or lower N bits (c1c2 . . . cN) in a bit sequence with a length of (M+N), which is mapped to each of the NOMA constellation points, are defined according to the following equation:

$$c_1=(((a_1 \otimes a_3) \otimes a_5) \ldots \otimes a_{M-1}) \textcircled{z}\, b_1$$

$$c_2=(((a_2 \otimes a_4) \otimes a_6) \ldots \otimes a_M) \textcircled{z}\, b_2$$

$$c_i=b_i (3 \le i \le N), \quad \text{[Equation]}$$

- where '⊗' and 'ⓩ' are identical or different predetermined bit-wise operations, 'b1b2 . . . bN' is a bit sequence for the first UE, 'a1a2 . . . aM' is a bit sequence for the second UE, 'M' and 'N' are integers, 'M' is modulation order of the second UE, and 'N' is a number of bits corresponding to modulation order of the first UE.

9. A method for transmitting a signal by a base station (BS) in a wireless communication system supporting non-orthogonal multiple access (NOMA), the method comprising:

determining a NOMA constellation by considering downlink transmit power and modulation order for each of a first user equipment (UE) and a second UE which belong to a same NOMA pair;

modulating a NOMA signal in which a signal for the first UE and a signal second UE are superposed based on the NOMA constellation; and transmitting the NOMA signal, wherein only a bit is differently configured between bit sequences of NOMA constellation points adjacent to each other in the NOMA constellation, wherein complex coordinates (I, Q) of the NOMA constellation points are determined based on a combination of downlink transmit power for the first UE and downlink transmit power for the second UE, and wherein upper or lower N bits (c1c2 . . . cN) in a bit sequence with a length of (M+N), which is mapped to each of the NOMA constellation points, are defined according to the following equation:

$$c_1=(((a_1 \otimes a_3) \otimes a_5) \ldots \otimes a_{M-1}) ⓩ b_1$$

$$c_2=(((a_2 \otimes a_4) \otimes a_6) \ldots \otimes a_M) ⓩ b_2$$

$$c_i=b_i (3 \leq i \leq N), \quad \text{[Equation]}$$

where '⊗' and 'ⓩ' are identical or different predetermined bit-wise operations, 'b1b2 . . . bN' is a bit sequence for the first UE, 'a1a2 . . . aM' is a bit sequence for the second UE, 'M' and 'N' are integers, 'M' is modulation order of the second UE, and 'N' is a number of bits corresponding to modulation order of the first UE.

10. The method of claim 9, wherein remaining M bits in the (M+N)-length bit sequence are configured to be identical to the bit sequence of the second UE, 'a1a2 . . . aM', and wherein the predetermined bit-wise operations include at least one of an exclusive OR (XOR) operation and a not exclusive OR (XNOR) operation.

11. The method of claim 9, wherein the NOMA constellation includes M2 constellation point groups, each having N2 constellation points, and wherein spacing between N2 constellation points belonging to a same constellation point group is determined based on the downlink transmit power for the first UE and spacing between centers of the M2 constellation point groups is determined based on the downlink transmit power of the second UE.

12. The method of claim 9, wherein a same beam pattern is applied to the first and second UEs belonging to a same NOMA pair, and wherein a difference between the downlink transmit power of the first and second UEs is equal to or greater than a predetermined threshold.

13. The method of claim 9, further comprising:

signaling, to a UE with lower downlink transmit power among the first and second UEs, information on modulation order and downlink transmit power of the other UE with higher downlink transmit power among the first and second UEs.

* * * * *